United States Patent
Okuda et al.

(10) Patent No.: US 12,017,648 B2
(45) Date of Patent: Jun. 25, 2024

(54) VEHICLE CONTROL DEVICE

(71) Applicant: Hitachi Automotive Systems, Ltd., Hitachinaka (JP)

(72) Inventors: Yuuki Okuda, Hitachinaka (JP); Takashi Okada, Hitachinaka (JP); Kengo Kumano, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 629 days.

(21) Appl. No.: 17/051,874

(22) PCT Filed: Feb. 14, 2019

(86) PCT No.: PCT/JP2019/005220
§ 371 (c)(1),
(2) Date: Oct. 30, 2020

(87) PCT Pub. No.: WO2019/220717
PCT Pub. Date: Nov. 21, 2019

(65) Prior Publication Data

US 2021/0188264 A1   Jun. 24, 2021

(30) Foreign Application Priority Data

May 15, 2018 (JP) ................................. 2018-093663

(51) Int. Cl.
*B60W 30/095* (2012.01)
*B60W 30/12* (2020.01)
(Continued)

(52) U.S. Cl.
CPC ........ *B60W 30/0956* (2013.01); *B60W 30/12* (2013.01); *B60W 30/18163* (2013.01);
(Continued)

(58) Field of Classification Search
CPC .......... B60W 30/12; B60W 30/18163; B60W 2554/4045; B60W 2554/406; G08G 1/167
See application file for complete search history.

(56) References Cited

U.S. PATENT DOCUMENTS 6,311,120 B1 * 10/2001 Asada ............. B60W 30/18145
367/87
2010/0179741 A1 * 7/2010 Pelosse ........... B60W 30/18145
701/96
(Continued)

FOREIGN PATENT DOCUMENTS

JP  H07-081604 A   3/1995
JP  2011-186737 A   9/2011
(Continued)

OTHER PUBLICATIONS

International Search Report with English translation and Written Opinion issued in corresponding application No. PCT/JP2019/005220 dated Apr. 23, 2019.

*Primary Examiner* — Anshul Sood
(74) *Attorney, Agent, or Firm* — Foley & Lardner LLP

(57) ABSTRACT

Provided is a vehicle control device capable of realizing fuel-efficient traveling of an own vehicle.
Therefore, a vehicle control device 100 includes a limiting factor determination unit 101 that determines whether there are a limiting factor on an own lane that limits traveling of an own vehicle in the own lane and a limiting factor on an adjacent lane that limits the traveling of the own vehicle in a lane adjacent to the own lane, a lane selection unit 102 that selects a lane in which the own vehicle travels based on a determination result of the limiting factor determination unit 101, and a driving force control unit 103 that controls a driving force of the own vehicle based on the lane selected by the lane selection unit 102.

12 Claims, 16 Drawing Sheets

(51) Int. Cl.
*B60W 30/18* (2012.01)
*G08G 1/16* (2006.01)

(52) U.S. Cl.
CPC .............. *G08G 1/16* (2013.01); *G08G 1/167* (2013.01); *B60W 2520/10* (2013.01); *B60W 2554/4041* (2020.02); *B60W 2554/4042* (2020.02); *B60W 2554/4044* (2020.02); *B60W 2554/406* (2020.02); *B60W 2554/802* (2020.02)

(56) References Cited

U.S. PATENT DOCUMENTS

| | | | |
|---|---|---|---|
| 2011/0313665 A1* | 12/2011 | Lueke | G01S 13/931 |
| | | | 701/301 |
| 2015/0194055 A1* | 7/2015 | Maass | B60W 30/18163 |
| | | | 340/905 |
| 2017/0076598 A1* | 3/2017 | Scofield | H04W 4/024 |
| 2018/0118223 A1* | 5/2018 | Mori | B60W 40/04 |
| 2018/0178801 A1* | 6/2018 | Hashimoto | B60W 30/18163 |
| 2018/0203457 A1* | 7/2018 | Moosaei | G05D 1/0088 |
| 2019/0100211 A1* | 4/2019 | Liu | B60W 10/20 |
| 2019/0276013 A1* | 9/2019 | Kim | G06V 20/588 |
| 2019/0322281 A1* | 10/2019 | Wang | G01C 21/3658 |
| 2020/0066160 A1 | 2/2020 | Mishina | |

FOREIGN PATENT DOCUMENTS

| | | |
|---|---|---|
| JP | 2014-019387 A | 2/2014 |
| JP | 2016-016829 A | 2/2016 |
| JP | 2017-088045 A | 5/2017 |
| WO | WO-2018/020547 A1 | 2/2018 |

\* cited by examiner (a)

(b)

VEHICLE CONTROL DEVICE

TECHNICAL FIELD

The present invention relates to a vehicle control device.

BACKGROUND ART

Conventionally, as a technique in such a field, for example, there are techniques disclosed in the following PTLs 1 and 2. PTL 1 discloses a vehicle control device including a surrounding environment recognition means for recognizing a surrounding environment of an own vehicle, a driving state detection means for detecting a driving state of the own vehicle, and a driving support means for executing overtaking control of a preceding vehicle. According to the vehicle control device, when the own vehicle changes a lane to the overtaking lane and overtakes the preceding vehicle, the driving support means determines whether to continue or interrupt the overtaking control when there is congestion in front of the preceding vehicle, thereby reducing driver discomfort.

PTL 2 discloses a vehicle control device that includes an inter-vehicle distance control unit that performs follow-up control on a preceding vehicle at a preset speed, and a lane change determination unit that determines whether to change a lane based on a traveling speed of an own vehicle, a setting speed of the own vehicle, a traffic flow speed of the own lane, and an estimated fuel efficiency on the own lane and other lanes. According to the vehicle control device, it is possible to change a lane in consideration of fuel efficiency to the destination while maintaining the follow-up control.

CITATION LIST

Patent Literature

PTL 1: JP 2016-16829 A
PTL 2: JP 2017-88045 A

SUMMARY OF INVENTION

Technical Problem

However, since the vehicle control devices described in PTLs 1 and 2 do not estimate whether the preceding vehicle reached the traveling state for some reasons at the time of overtaking or changing a lane, as a result of following-up and changing a lane, it is often forced to decelerate due to congestion at the change destination. For this reason, there is a problem in that the fuel consumption increases and it is not possible to realize fuel-efficient traveling of the own vehicle.

The present invention has been made to solve such a technical problem, and an object of the present invention is to provide a vehicle control device capable of realizing fuel-efficient traveling of an own vehicle.

Solution to Problem

A vehicle control device according to the present invention includes a limiting factor determination unit that determines whether there are a limiting factor on an own lane that limits traveling of an own vehicle in the own lane and a limiting factor on an adjacent lane that limits the traveling of the own vehicle in a lane adjacent to the own lane, and a lane selection unit that selects a lane in which the own vehicle travels based on a determination result of the limiting factor determination unit.

Advantageous Effects of Invention

According to the present invention, by including the limiting factor determination unit, it is possible to estimate the acceleration of the preceding vehicle and the factors of the lane change of the preceding vehicle and it is possible to accurately determine whether the vehicle should continue to travel in an own lane or change to the adjacent lane. Therefore, by selecting the lane in which the vehicle speed fluctuation of the own vehicle can be reduced, it is possible to realize the fuel-efficient traveling of the own vehicle.

DESCRIPTION OF EMBODIMENTS

Figure 1:
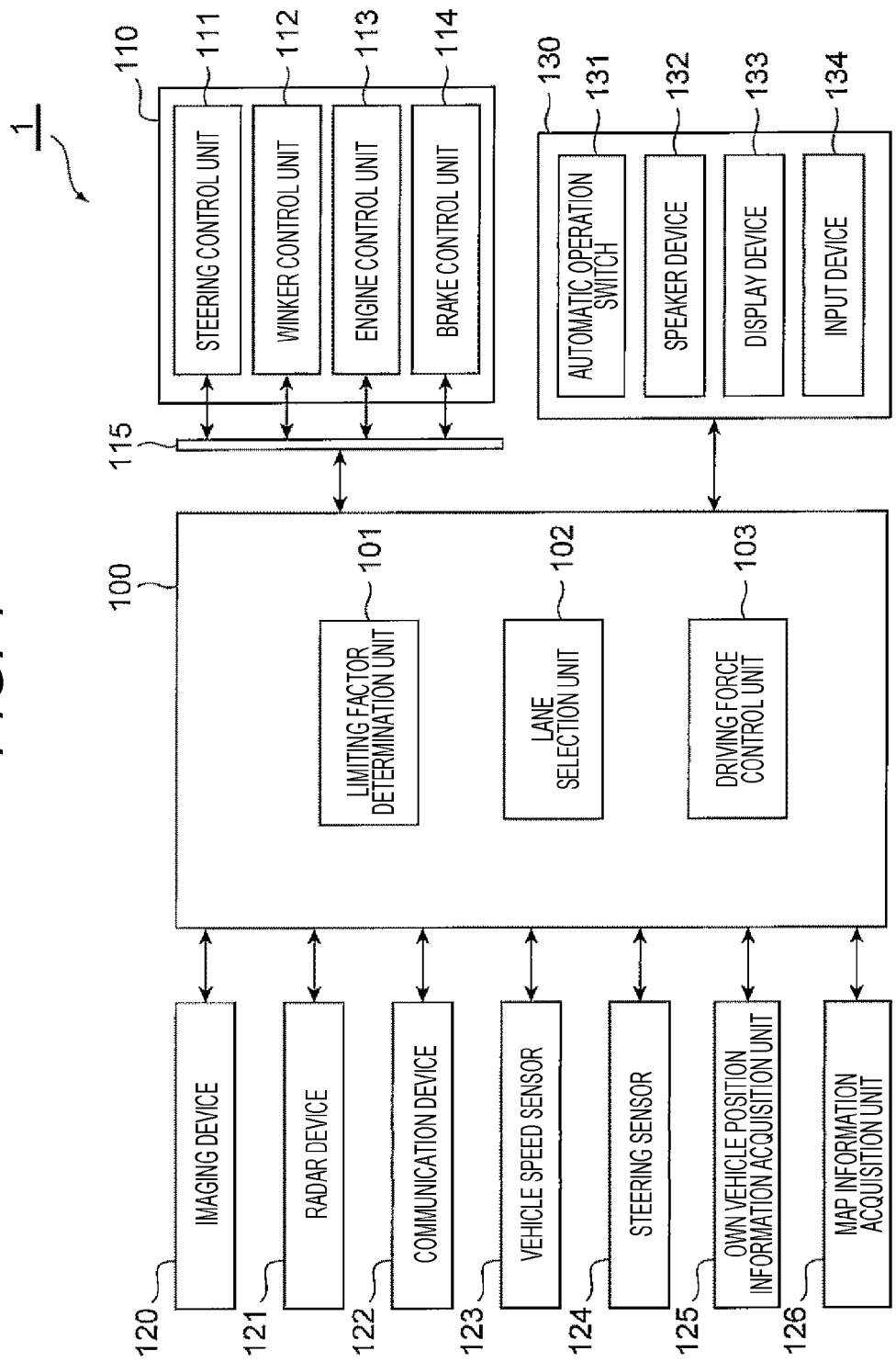
FIG. 1 is a schematic configuration diagram illustrating an automatic driving system to which a vehicle control device according to a first embodiment is applied.

Hereinafter, embodiments of a vehicle control device according to the present invention will be described with reference to the drawings. In the description of the drawings, the same elements are designated by the same reference numerals, and duplicate description thereof will be omitted.

First Embodiment

FIG. 1 is a schematic configuration diagram illustrating an automatic driving system to which a vehicle control device according to a first embodiment is applied. A vehicle control device 100 according to the present embodiment is, for example, a device that is provided in an automatic driving system 1 and performs automatic traveling of a vehicle in cooperation with a traveling execution unit or the like based on detection information of an on-board radar or sensor or the like.

The automatic driving system 1 is mounted on a vehicle, and in addition to the vehicle control device 100, includes a traveling execution unit 110, an imaging device 120, a radar device 121, a communication device 122, a vehicle speed sensor 123, a steering angle sensor 124, an own vehicle position information acquisition unit 125, a map information acquisition unit 126, and a human machine interface 130.

The traveling execution unit 110 mainly includes a steering control unit 111, a winker control unit 112, an engine control unit 113, and a brake control unit 114. These control units are connected to the vehicle control device 100 via an in-vehicle network 115. A communication method such as a control area network (CAN) can be preferably used for the in-vehicle network 115.

The steering control unit 111, the winker control unit 112, the engine control unit 113, and the brake control unit 114 are constituted by, for example, a microcomputer in which a central processing unit (CPU) that executes calculations, a read only memory (ROM) as a secondary storage device that records a program for the calculations, and a random access memory (RAM) as a temporary storage device that stores a calculation progress and temporary control variables are combined. A memory using a semiconductor is preferably used for the ROM and the RAM, but elements such as an optical disk or a magnetic disk can also be used for the ROM.

The microcomputer that constitutes these control units may be configured to store calculation results, learning results, event records, or the like in a hard disk or a writable flash memory and reuse the stored calculation results, learning results, event records, or the like at the next startup when the microcomputer is not supplied with power after completing a control process, or when the microprocessor is in an inactive state in which the main calculation is not performed at a low power consumption state.

The imaging device 120 is constituted by a stereo camera using, for example, a solid-state imaging device such as a charge coupling element (CCD), and acquires a road condition in front of an own vehicle, aspects of obstacles including a preceding vehicle, regulatory information, an environmental condition, and the like. The imaging device 120 is connected to the vehicle control device 100, and outputs the acquired information to the vehicle control device 100.

The radar device 121 detects obstacles such as other vehicles existing in front, side, rear, and the like of the own vehicle, and acquires information such as a distance between the own vehicle and the obstacle, identification information of the other vehicle, or a relative speed. The radar device 121 is connected to the vehicle control device 100, and outputs the detected and acquired information to the vehicle control device 100.

The communication device 122 transmits and receives information, and acquires, for example, information on a traveling route of the own vehicle by communicating with a control center, acquires a traveling speed of a peripheral vehicle by communicating with another vehicle traveling around the own vehicle, or acquires information such as the remaining time until traffic signals are displayed and the display ends by communicating with an infrastructure information center. The communication device 122 is connected to the vehicle control device 100, and outputs the acquired information to the vehicle control device 100.

The vehicle speed sensor 123 detects the traveling speed of the own vehicle, and the steering angle sensor 124 detects a steering angle of the own vehicle. These sensors are each connected to the vehicle control device 100, and output the detected information to the vehicle control device 100.

The own vehicle position information acquisition unit 125 acquires the current position of the own vehicle on the earth by Global Positioning System (GPS), and outputs the acquired information to the vehicle control device 100. The map information acquisition unit 126 acquires information such as a speed limit of the traveling route of the own vehicle, a curve shape in front of the vehicle, the number of lanes based on the current position of the own vehicle acquired by the own vehicle position information acquisition unit 125. The map information acquisition unit 126 outputs the acquired information to the vehicle control device 100.

The human machine interface 130 is connected to the vehicle control device 100, and displays or notifies various control states according to a control command from the vehicle control device 100, or receives an input by a driver. The human machine interface 130 includes an automatic operation switch 131 that allows a driver to command execution of automatic operation control to be permitted, interrupted, or prohibited, a speaker device 132, a display device 133 that visually provides information, and an input device 134 that receives the input of the driver.

The input device 134 may be a button or lever provided on a side of a steering column, front and back surfaces of a steering wheel, a dashboard or an instrument panel, or may be a sound collecting device such as a microphone. In this way, for example, the driver can perform an input of a destination point, an input of a target speed described later, or the like by an operation of the button or lever or a voice input. Note that the display device 133 may be a device capable of inputting an operation from a driver, such as a touch panel.

On the other hand, like the above-described control unit, the vehicle control device 100 is constituted by the microcomputer having the CPU, the ROM, the RAM, and the like, and includes a limiting factor determination unit 101, a lane selection unit 102, and a driving force control unit 103.

The limiting factor determination unit 101 determines whether there are a limiting factor on an own lane that limits the traveling of the own vehicle in the own lane and a limiting factor on the adjacent lane that limits the traveling of the own vehicle in the lane adjacent to the own lane. Examples of the limiting factors on the own lane include a preceding vehicle that travels in the own lane and is slower than the own vehicle, congestion of the vehicle, a stopped vehicle on the own lane, a red light on the own lane, and the like.

In the present embodiment, the stopped vehicle includes a parked vehicle and a stopping vehicle.

On the other hand, examples of the limiting factors on the adjacent lane include the vehicle congestion on the adjacent lane, high-speed approach of the following vehicle on the adjacent lane, a stopped vehicle on the adjacent lane, a red light on the adjacent lane, and the like. Specific examples of the limiting factors on the own lane and the limiting factors on the adjacent lane will be described in detail later.

The lane selection unit 102 selects the lane in which the own vehicle travels based on the determination result of the limiting factor determination unit 101. When the lane selection unit 102 selects the traveling lane, a steering angle operation by the above-described steering control unit 111 and lighting/winking of a direction indicator by the winker control unit 112 are performed according to the selection result. The steering angle operation by the steering control unit 111 is performed by an electric power steering device (not illustrated). The electric power steering device drives a motor mounted thereon so that the steering angle detected by the steering angle sensor 124 becomes a desired steering angle.

The driving force control unit 103 controls the driving force of the own vehicle based on the lane selected by the lane selection unit 102. The driving force control unit 103 is connected to the engine control unit 113 and the brake control unit 114, respectively, and commands these control units to increase or decrease the driving force or the braking force.

For example, the driving force control unit 103 commands the engine control unit 113 to increase the driving force and commands the brake control unit 114 to increase the braking force so that the speed of the own vehicle detected by the vehicle speed sensor 123 is adjusted to the set target speed. That is, when the speed of the own vehicle is lower than the target speed, the driving force control unit 103 transmits the command to increase the driving force to the engine control unit 113. On the other hand, when the speed of the own vehicle exceeds the target speed, the lane selection unit 102 transmits the command to increase the braking force to the brake control unit 114. In addition to the increase in the braking force due to such braking, the driving force control unit 103 can also perform deceleration using the engine brake of the engine by transmitting a command to reduce the driving force to the engine control unit 113. For these, an appropriate method is selected according to the difference between the target speed and the speed of the own vehicle.

Upon receiving the command to increase the driving force, in order to increase the output of the engine (not illustrated), the engine control unit 113 controls a throttle actuator (not illustrated) to increase the amount of air taken in by the engine. As a result, the fuel injection amount increases and the pressure energy accompanied by the combustion inside the engine increases, so a rotational force of a power shaft of the engine increases and the own vehicle is accelerated.

On the other hand, upon receiving the command to increase the braking force, the brake control unit 114 increases a hydraulic pressure of a master cylinder (not illustrated) in order to increase a pressing force of a brake pad (not illustrated). When the pressing pressure of the brake pad increases, a frictional braking force that converts a rotational force of vehicle tire into heat increases, so the own vehicle is decelerated. In addition, when receiving the command to reduce the driving force, in order to reduce the output of the engine, the engine control unit 113 controls the throttle actuator to reduce the amount of air taken in by the engine. As a result, since the fuel injection amount is reduced and the pressure energy accompanied by combustion inside the engine is reduced, the rotational force of the power shaft of the engine is reduced, so it is difficult to overcome a traveling resistance of the own vehicle transmitted from the tire (not illustrated) and the own vehicle is decelerated due to the traveling resistance. Furthermore, since the engine control unit 113 stops the fuel injection of the engine to prevent combustion inside the engine, the engine is turned from the tire side by an inertial force accompanied by the traveling of the own vehicle to activate the engine brake, so the vehicle is decelerated by the engine braking force in addition to the traveling resistance.

Note that the target speed may be set to maintain the speed at the time when the automatic operation switch 131 is operated by the driver, or may be set to an arbitrary value by the input to the human machine interface 130 by the driver. Further, when the speed limit of the traveling route is acquired via the above-described communication device 122 or map information acquisition unit 126, the acquired speed limit may be automatically set as the target speed.

Further, the target speed is automatically set in order to safely drive the own vehicle against obstacles in front of the vehicle (for example, a preceding vehicle, a stop line, and the like) obtained through the imaging device 120 or the radar device 121. Specifically, when the obstacle is a preceding vehicle, the inter-vehicle distance that can avoid collision with the preceding vehicle is set as a target inter-vehicle distance, and furthermore, the comparison between the inter-vehicle distance obtained via the imaging device 120 or the radar device 121 and the set target inter-vehicle distance is performed. When the obtained inter-vehicle distance is larger than the target inter-vehicle distance, the target speed is set to a value larger than the current target speed in order to shorten the inter-vehicle distance. On the other hand, when the obtained inter-vehicle distance is smaller than the target inter-vehicle distance, the target speed is set to a value smaller than the current target speed in order to lengthen the inter-vehicle distance.

Figure 2:
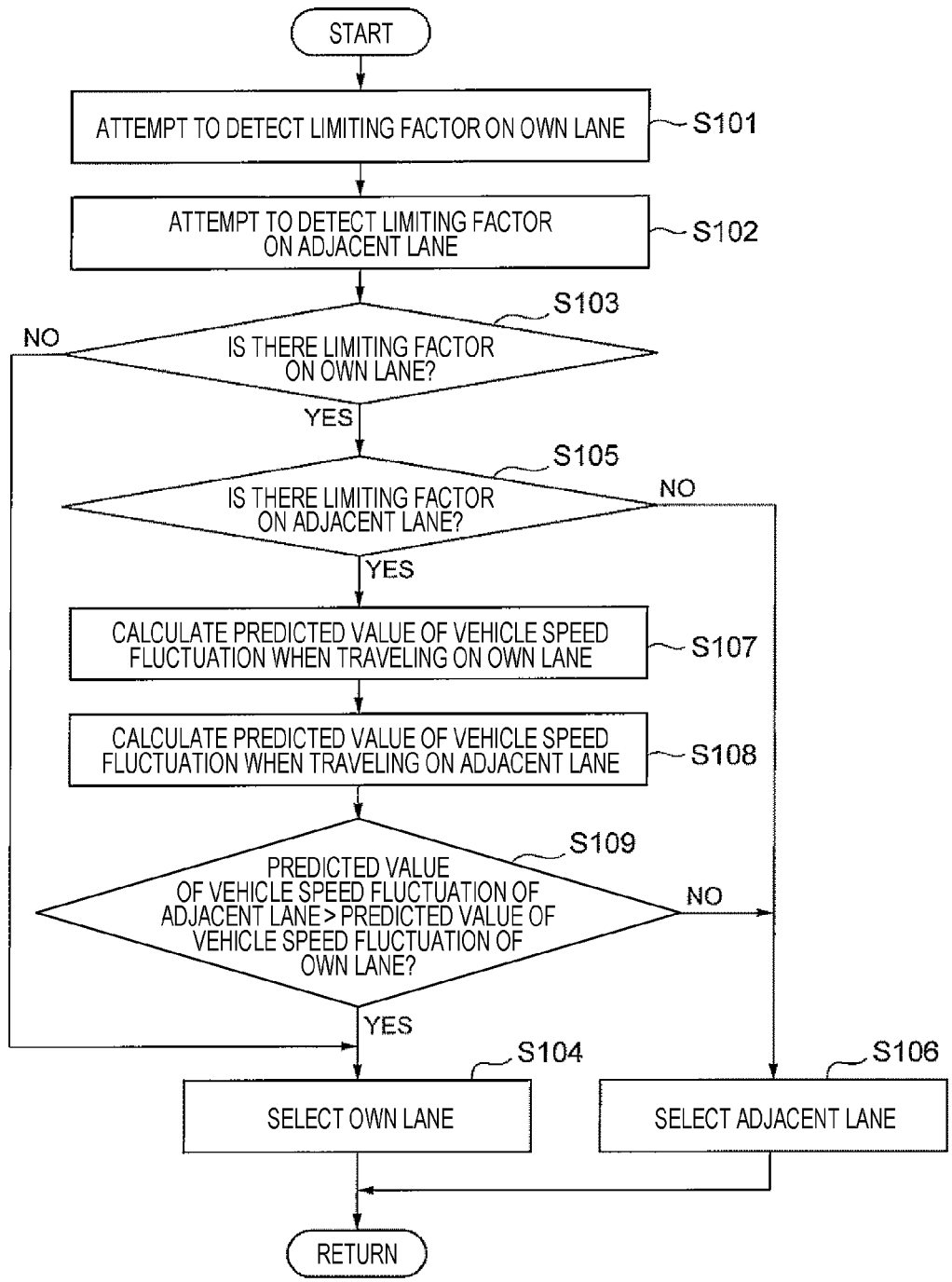
FIG. 2 is a flowchart illustrating a control process of the vehicle control device according to the first embodiment.

Hereinafter, the control process of the vehicle control device 100 will be described with reference to each scene illustrated in FIGS. 3 to 5 with reference to FIG. 2. FIG. 2 is a flowchart illustrating the control process of the vehicle control device according to the first embodiment. The control process described in the flowchart of FIG. 2 is repeatedly executed at a predetermined cycle.

First, in step S101, an attempt is made to detect the limiting factor on the own lane. At this time, the imaging device 120 or the radar device 121 detects, for example, the presence or absence of obstacles in the own lane, and outputs the detected result to the limiting factor determination unit 101. Next, in step S102, an attempt is made to detect the limiting factor on the adjacent lane. At this time, the imaging device 120 or the radar device 121 detects, for example, the presence or absence of obstacles in the adjacent lane, and outputs the detected result to the limiting factor determination unit 101.

Next, in step S103, the limiting factor determination unit 101 determines whether or not there the limiting factor on the own lane exists in the own lane based on the result detected in step S101. When it is determined that there is no limiting factor on the own lane, the control process proceeds to step S104. In step S104, the lane selection unit 102 selects the own lane when the own vehicle travels.

Figure 3:
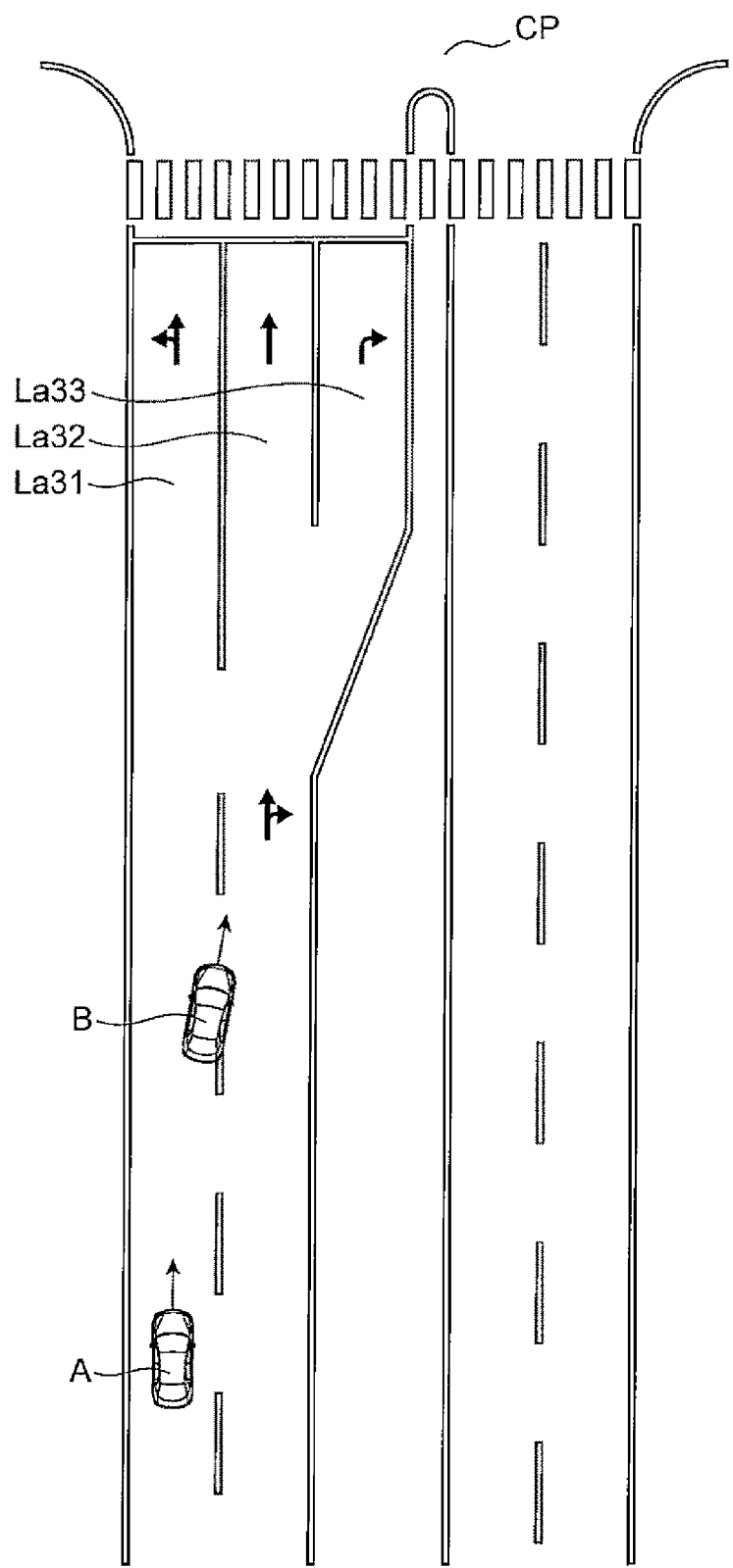
FIG. 3 is a schematic diagram illustrating a traveling state of a preceding vehicle turning right at an intersection and an own vehicle.

The above-described process is applied to the scene illustrated in FIG. 3, for example. In the scene illustrated in FIG. 3, an own vehicle A selects a preceding vehicle B as a follow-up target, travels following-up the preceding vehicle B, and travels toward an intersection CP. The preceding vehicle B changes a lane from an own lane (that is, left lane) La31 to an adjacent lane (that is, right lane) La32. By the time the preceding vehicle B changes a lane, the radar device 121 does not detect other vehicles that become obstacles on the side and rear of the own vehicle A, so the own vehicle A is in a state in which the own vehicle A can change a state. Note that the preceding vehicle B is traveling at a lower speed than the own vehicle A.

At this time, the imaging device 120 or the radar device 121 does not detect a new preceding vehicle on the own lane La31, but detects that the preceding vehicle B changes a lane to the adjacent lane La32 in order to enter a right turn lane La33 and outputs the detection result to the limiting factor determination unit 101. Based on the detection result from the imaging device 120 or the radar device 121, the limiting factor determination unit 101 estimates that it is highly possible that the preceding vehicle B changes a lane in order to make a right turn at the intersection CP, and determines that there are the limiting factors on the adjacent lane. Further, the limiting factor determination unit 101 determines that the vehicle speed fluctuation of the own vehicle A is smaller when the own vehicle A travels in the own lane La31 as it is, and outputs the determination result to the lane selection unit 102.

The lane selection unit 102 stops following-up the preceding vehicle B based on the determination result of the limiting factor determination unit 101, and selects the own lane La31 so that the own vehicle A continues to travel in the own lane La31.

That is, in the scene illustrated in FIG. 3, the limiting factor determination unit 101 determines that there is no limiting factor on the own lane and there is a limiting factor on the adjacent lane. The lane selection unit 102 continues to select the own lane La31 without changing the lane from the own lane La31 based on the determination result. By doing so, it is possible to suppress an increase in fuel consumption and prevent deterioration of fuel efficiency by preventing the unnecessary lane change. Here, when the limiting factor determination unit 101 determines that there is no limiting factor on the own lane, the lane selection unit 102 may immediately select the own lane La31 without determining the limiting factor on the adjacent lane described above. By doing so, the processing speed of the control process can be increased.

On the other hand, when it is determined in step S103 described above that there is the limiting factor on the own lane, the control process proceeds to step S105. In step S105, the limiting factor determination unit 101 further determines whether or not the limiting factor on the adjacent lane exists in the adjacent lane. When it is determined that there is no limiting factor on the adjacent lane, the control process proceeds to step S106, and the lane selection unit 102 selects the adjacent lane. As a result, as described above, the steering angle operation by the steering control unit 111 and the winking of the direction indicator by the winker control unit 112 are performed, and the lane change is executed.

Figure 4:
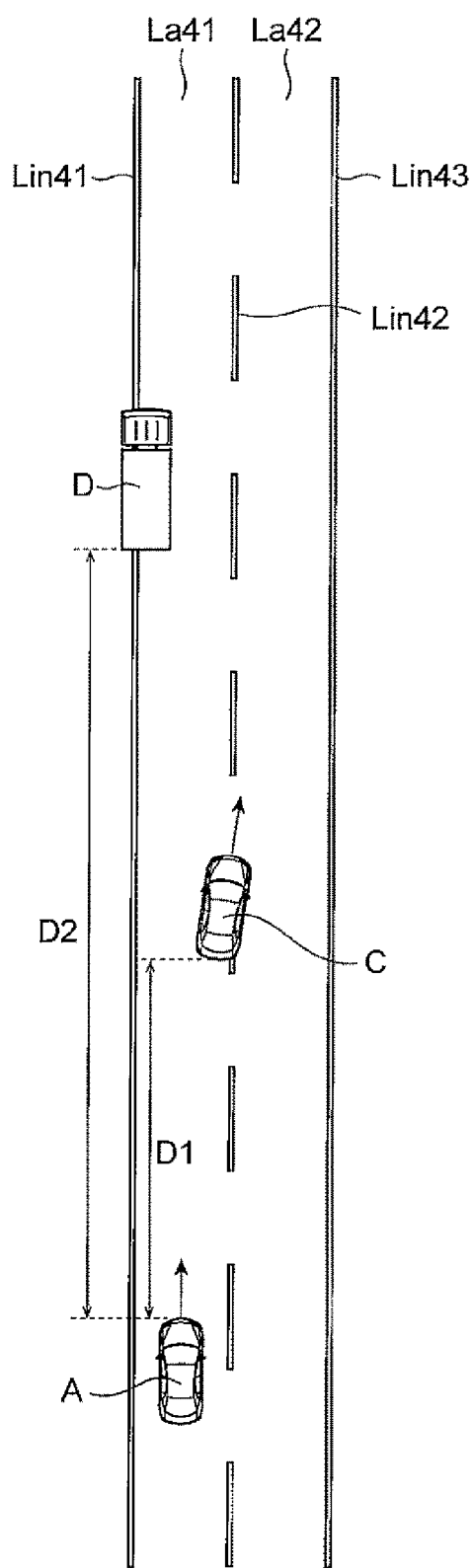
FIG. 4 is a schematic diagram illustrating a traveling state of a preceding vehicle traveling toward a stopped vehicle and an own vehicle.

The above-described process is applied to the scene illustrated in FIG. 4, for example. In the scene illustrated in FIG. 4, there is a two-lane road consisting of an own lane La41 on which the own vehicle A and a preceding vehicle C are traveling and an adjacent lane La42, and a stopped vehicle D that becomes an obstacle exists on paths of the own vehicle A and the preceding vehicle C.

Here, in order to make the content easier to understand, a road has no oncoming lane or sidewalk, but there may have the oncoming lane or sidewalk. In addition, although a left-hand traffic is described here, a right-hand traffic may be used. In that case, the present invention is applied to even the case where the left-right relationship is reversed.

In the scene illustrated in FIG. 4, while the own vehicle A is traveling, the imaging device 120 detects the preceding vehicle C, the stopped vehicle D, an inter-vehicle distance D1 between the own vehicle A and the preceding vehicle C, an inter-vehicle distance D2 between the own vehicle A and the stopped vehicle D, and lateral lines Lin41, Lin42, and Lin43 dividing each lane, respectively. These detection processes are executed in the imaging device 120 or the vehicle control device 100 separately from a routine illustrated in FIG. 2.

As the method for detecting a lane and lateral lines, a well-known technique is applied, but for example, the image information obtained by the imaging device 120 is subjected to appropriate color tone conversion or binarization, and then edge detection process is performed, and the lane and the dividing line are recognized by obtaining the linear approximation line of the edge detection point with high likelihood. Further, regarding the preceding vehicle C and the stopped vehicle D, the existence of the vehicle is recognized by detecting a region having a shape or an aspect ratio similar to the rear of the vehicle based on the image information obtained by the imaging device 120.

The inter-vehicle distance D1 between the own vehicle A and the preceding vehicle C and the inter-vehicle distance D2 between the own vehicle A and the stopped vehicle D are calculated based on the above-described vehicle recognition result and the position in the image information. Specifically, since the imaging device 120 is constituted by a stereo camera equipped with two image sensor elements, the imaging device 120 can acquire a parallax image by installing the two image sensor elements at appropriate intervals, and can obtain the inter-vehicle distance by converting a positional deviation on pixels into a distance. In addition, by repeatedly obtaining the inter-vehicle distance thus obtained from the image information acquired at a predetermined time interval, the change in the inter-vehicle distance can be calculated as a change in relative speed. Based on the calculated relative speed and the speed of the own vehicle A, the speeds of the preceding vehicle C and the stopped vehicle D can be obtained, respectively (in this case, the speed of the stopped vehicle D is zero).

In the scene illustrated in FIG. 4, since the preceding vehicle C changes a lane, for the own vehicle A, the stopped vehicle D is detected as a new candidate for the preceding vehicle. By the time the preceding vehicle C changes a lane, the radar device 121 does not detect other vehicles that become obstacles on the side and rear of the own vehicle A, so the own vehicle A is in the state in which the own vehicle A can change a lane.

Here, the limiting factor determination unit 101 determines that there is the limiting factor on the own lane because the stopped vehicle D exists on the own lane La41. In addition, because the preceding vehicle C changes a lane from the own lane La41 to the adjacent lane La42, the limiting factor determination unit 101 estimates that the preceding vehicle C changes a lane in order to avoid the stopped vehicle D and determines that the vehicle speed fluctuation of the own vehicle A is smaller when the own vehicle A travels by changing a lane to the adjacent lane La42 than when the own vehicle A travels in the own lane La41. As a result, the lane selection unit 102 continues to follow-up the preceding vehicle C and selects the adjacent lane La42. Then, the own vehicle A continues to change a lane to the preceding vehicle C.

That is, in the scene illustrated in FIG. 4, the limiting factor determination unit 101 determines that there is the limiting factor on the own lane, but determines that there is the limiting factor on the adjacent lane because there are no obstacles such as further preceding vehicles in front of the preceding vehicle C that changes a lane to the adjacent lane La42. The lane selection unit 102 selects the adjacent lane La42 based on the determination result of the limiting factor determination unit 101.

On the other hand, when it is determined in step S105 described above that there is the limiting factor on the adjacent lane, the control process proceeds to step S107. In step S107, the limiting factor determination unit 101 calculates a predicted value (hereinafter, referred to as the predicted value of the vehicle speed fluctuation of the own lane) of the vehicle speed fluctuation when traveling in the own lane based on the limiting factor on the own lane.

Next, in step S108, the limiting factor determination unit 101 further calculates a predicted value (hereinafter, referred to as the predicted value of the vehicle speed fluctuation of the adjacent lane) of the vehicle speed fluctuation when traveling in the adjacent lane based on the limiting factor on the adjacent lane.

Next, in step S109, the limiting factor determination unit 101 compares the predicted value of the vehicle speed fluctuation of the own lane calculated in step S107 with the predicted value of the vehicle speed fluctuation of the adjacent lane calculated in step S108. Then, when the predicted value of the vehicle speed fluctuation of the adjacent lane is greater than that of the vehicle speed fluctuation of the own lane, the control process proceeds to step S104 described above, and the lane selection unit 102 selects the own lane. On the other hand, when the predicted value of the vehicle speed fluctuation of the adjacent lane is equal to or smaller than that of the vehicle speed fluctuation of the own lane, the control process proceeds to step S106 described above, and the lane selection unit 102 selects the adjacent lane.

Figure 5:
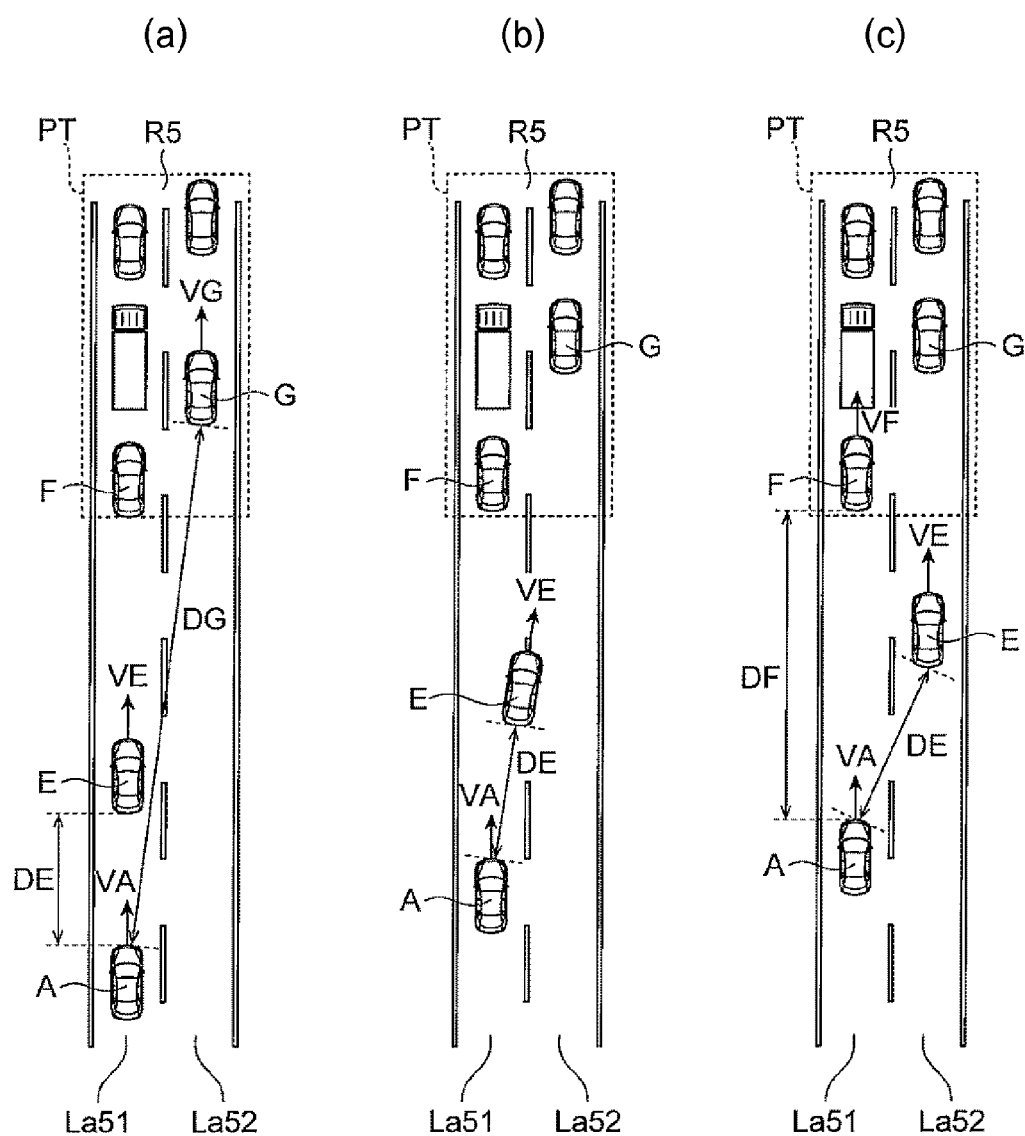
FIG. 5 is a schematic diagram illustrating a traveling state of a preceding vehicle that changes a lane on a congested two-lane road and an own vehicle.

The above-described process is applied to the scene illustrated in FIG. 5, for example. In the scene illustrated in FIG. 5, a preceding vehicle E traveling in an own lane (that is, the left lane) La51 of a congested two-lane road R5 changes a lane to an adjacent lane (that is, right lane) La52. There is a congested vehicle group PT ahead of the preceding vehicle E. In the congested vehicle group PT, a rearmost vehicle F exists at an end of the own lane La51, and a rearmost vehicle G exists at an end of the adjacent lane La52.

FIG. 5(*a*) illustrates a state before the preceding vehicle E changes a lane, FIG. 5(*b*) illustrates a state while the preceding vehicle E changes a lane, and FIG. 5(*c*) illustrates a state in which the preceding vehicle E ends a lane change. In the state illustrated in FIG. 5(*a*), the imaging device 120 detects the preceding vehicle E and the rearmost vehicle G, calculates an inter-vehicle distance DE between the own vehicle A and the preceding vehicle E, and an inter-vehicle distance DG between the own vehicle A and the rearmost vehicle G, and calculates a speed VE of the preceding vehicle E and a speed VG of the rearmost vehicle G. At this time, the speed VG of the rearmost vehicle G is lower than the speed VE of the preceding vehicle E.

In the state illustrated in FIG. 5(*b*), the preceding vehicle E starts changing a lane. Then, during the lane change of the preceding vehicle E or after the lane change of the preceding vehicle E ends (see FIG. 5(*c*)), the rearmost vehicle F at the end of the own lane La51 is newly detected by the imaging device 120. The imaging device 120 calculates the inter-vehicle distance DF between the own vehicle A and the rearmost vehicle F and the speed VF of the rearmost vehicle F.

Figure 6:
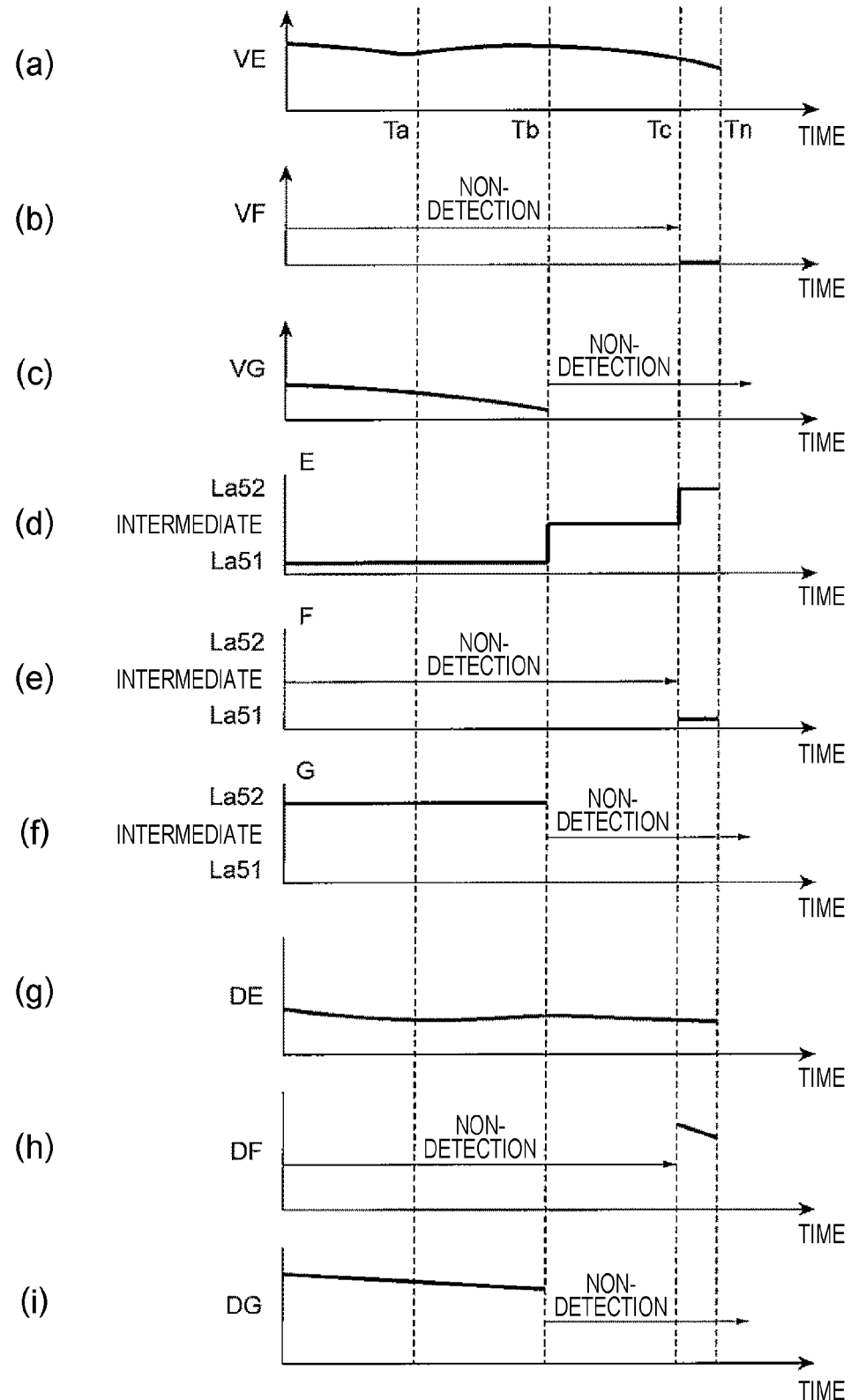
FIG. 6 is a graph illustrating a change in speed, a lane transition, and a change in an inter-vehicle distance of a preceding vehicle and each rearmost vehicle.

FIG. 6 is a graph illustrating the change in speed, the lane transition, and the change in the inter-vehicle distance of the preceding vehicle E, the rearmost vehicle F, and the rearmost vehicle G. FIG. 6(*a*) illustrates the change in the speed VE of the preceding vehicle E, FIG. 6(*b*) illustrates the change in the speed VF of the rearmost vehicle F, FIG. 6(*c*) illustrates the change in the speed VG of the rearmost vehicle G, FIG. 6(*d*) illustrates the lane transition of the preceding vehicle E, FIG. 6(*e*) illustrates the lane transition of the rearmost vehicle F, FIG. 6(*f*) illustrates the lane transition of the rearmost vehicle G, FIG. 6(*g*) illustrates the change in the inter-vehicle distance DE, FIG. 6(*h*) illustrates the change in the inter-vehicle distance DF, and FIG. 6(*i*) illustrates the change in the inter-vehicle distance DG. Note that there is a non-detection section in FIGS. 6(*b*), 6(*c*), 6(*e*), 6(*f*), 6(*h*), and 6(*i*) due to the position relationship between the preceding vehicle E and the own vehicle A.

In addition, a time Ta in FIG. 6 indicates the time corresponding to the state illustrated in FIG. 5(*a*), Tb indicates the time corresponding to the state illustrated in FIG. 5(*b*), Tc indicates the time corresponding to the state illustrated in FIG. 5(*c*), and Tn indicates the current time. At the time Tn, the lane selection unit 102 selects the traveling lane of the own vehicle A based on the determination result of the limiting factor determination unit 101.

At the time Ta, the own vehicle A is in the state in which the own vehicle A can change a lane. At this time, the rearmost vehicle G traveling at a low speed in the adjacent lane La52 is detected by the imaging device 120. Since the speed VE of the preceding vehicle E is higher than the speed VG of the rearmost vehicle G, the limiting factor determination unit 101 determines that there is the limiting factor on the adjacent lane in the adjacent lane La52.

Further, the limiting factor determination unit 101 performs a determination by setting a threshold for the speed at which the rearmost vehicle G is determined to be low speed, or setting a threshold for a collision margin time or a collision margin. Such a threshold is, for example, a form in which a speed is considered as a low speed when the speed is less than 10 km/h or less than 30 km/h, a form in which the collision margin time falls below 4 seconds or a reciprocal of the collision margin time exceeds a predetermined value when the own vehicle A is traveling at the speed VA, and a form in which the collision margin falls below 1 when deceleration is made at acceleration at which no psychological burden is placed on occupants.

$$TTCG = \frac{DG}{VA - VG} \quad (1)$$

A collision margin time TTCG is calculated by Equation (1) based on, for example, the speed VG of the rearmost vehicle G in the adjacent lane La52, the speed VA of the own vehicle A, and the inter-vehicle distance DG between the own vehicle A and the rearmost vehicle G.

$$MTCG = \frac{-DG - \frac{VG^2}{2\alpha}}{-\frac{VA^2}{2\alpha}} \quad (2)$$

When α is set as the acceleration at which there is no psychological burden on occupants, a collision margin MTCG is calculated by Equation (2) based on the speed VG of the rearmost vehicle G, the speed VA of the own vehicle A, and the inter-vehicle distance DG between the own vehicle A and the rearmost vehicle G.

In Equation (2), any value of −0.3 G to −0.01 G can be taken as the range of the acceleration α at which there is no psychological burden on occupants. Such a value may be set as a predetermined value based on an experiment or the like, or may be set as a value that changes with respect to the speed VA of the own vehicle A. In addition, α does not necessarily have to be set to the same value according to the speed of the own vehicle A and the preceding vehicle E, but may be set as different values such as αA (own vehicle A) and αG (rearmost vehicle G).

At the time Tb, the preceding vehicle E starts changing a lane and the rearmost vehicle G is not detected, but the limiting factor determination unit 101 determines that there is still the limiting factor in the adjacent lane La52. At this time, from the speed VG of the rearmost vehicle G and the acceleration of the rearmost vehicle G at this time and the speed VE of the preceding vehicle E and the acceleration of the preceding vehicle E at the time Tb, the collision margin time and the collision margin are each calculated based on the Equations (1) and (2).

When the collision margin time calculated at this time is smaller than the collision margin time calculated at the time Ta, or when the collision margin falls below 1, in order for the preceding vehicle E to avoid the collision with the rearmost vehicle G, the limiting factor determination unit 101 estimates that the deceleration is started at least within the collision margin time. Further, when the speed of the rearmost vehicle G is zero, or when the speed of the preceding vehicle E is smaller than the predetermined value and the acceleration of the preceding vehicle E is within the range in which the preceding vehicle E decelerates, the limiting factor determination unit 101 estimates that the preceding vehicle E is stopped. When the own vehicle A changes a lane following-up the preceding vehicle E, the limiting factor determination unit 101 determines that the speed VA of the own vehicle A needs to be decelerated within the collision margin time TTCE with the preceding vehicle E as long as it is estimated that the preceding vehicle E stops or decelerates. The predicted value of the change in speed when the lane is changed following the preceding vehicle E is obtained by VAEST2, and an average acceleration change value dαAEST2 is obtained by dαAEST2=VA/TTCE.

At the time Tc when the lane change of the preceding vehicle E is completed, the rearmost vehicle F is detected as a new preceding vehicle, and the collision margin time TTCF between the rearmost vehicle F and the own vehicle A is calculated accordingly. When the rearmost vehicle F is stopped or traveling at a low speed, since the own vehicle A needs to decelerate in order to avoid the collision with the rearmost vehicle F, the limiting factor determination unit 101 has the possibility that the limiting factor on the own lane exists in the own lane La51 based on the collision margin time TTCF and the collision margin MTCF. At this time, the predicted value VAEST1 of the change in speed of the own lane La51 is calculated by VAEST1=VA−VF, and the change value dαAEST1 of the acceleration is calculated by dαAEST1=VA/TTCF.

In the above-described calculation, the speed or the inter-vehicle distance obtained at that time can be used as it is. For example, the accelerations of the own vehicle A, the preceding vehicle E, the rearmost vehicle G, and the rearmost vehicle F may be calculated from the detection result of the speed acquired every 100 ms or 50 ms, and the speed or the inter-vehicle distance obtained at that time may be set as an initial value to obtain the estimated speed or the estimated position at the time of moving at a constant acceleration. The estimated speeds or the estimated positions of the own vehicle A, the preceding vehicle E, the rearmost vehicle G, and the rearmost vehicle F, such as 5 seconds ahead and 10 seconds ahead are calculated. Such estimation is repeated every calculation cycle of the vehicle control device 100. 10 ms, 50 ms, and 100 ms are appropriate as the calculation cycle, and all the calculation routines are not necessarily executed in the same calculation cycle, and can be changed according to the role of the calculation routine.

At the time Tn, the rearmost vehicle F exists as the limiting factor on the own lane, and the preceding vehicle E exists as the limiting factor on the adjacent lane, so the limiting factor determination unit 101 compares the predicted value of the change in speed or change in acceleration obtained above. The lane selection unit 102 selects a lane in which the predicted values of the change in speed or/and change in acceleration are small.

In FIG. 6, the predicted value of the change in speed at the time Tn has the relationship of VAEST1<VAEST2. In addition, when dαAEST1<dαAEST2, the lane selection unit 102 determines that the vehicle speed fluctuation of the own vehicle A is smaller when the own vehicle A continues to travel in the own lane La51 and continues to select the own lane La51.

In the above description, the case where the rearmost vehicle F and the rearmost vehicle G become obstacles to the preceding vehicle E and the own vehicle A has been described, but the present invention is not limited thereto, and a signal or a stop line may be obstacles instead of the rearmost vehicle F and the rearmost vehicle G. For example, when the signal display is blue, the signal or the stop line do not become obstacles, so the lane change of the preceding vehicle E is the same as the right turn situation described in FIG. 3. On the other hand, when the signal display is yellow or red, or when the signal display changes from blue to yellow or red until the own vehicle A arrives at the stop line, it is the same as the situation of the rearmost vehicle G and the rearmost vehicle F described above.

As described above, when the limiting factor determination unit 101 detects both the limiting factor on the own lane and the limiting factor on the adjacent lane, the limiting factor determination unit 101 calculates the predicted value of the vehicle speed fluctuation based on each limiting factor, and the lane selection unit 102 can select the lane in which the predicted value of the vehicle speed fluctuation is small based on the predicted value of the vehicle speed fluctuation calculated to suppress the vehicle speed fluctuation of the own vehicle A and provide the traveling with less fuel consumption.

Then, as illustrated in FIG. 2, when the above-described step S104 or step S106 ends, a series of control processes end.

The vehicle control device 100 configured as described above includes the limiting factor determination unit 101, and thus can estimate the acceleration of the preceding vehicle and the factors of the lane change of the preceding vehicle and can accurately determine whether the vehicle should continue to travel in an own lane or change to the adjacent lane. Therefore, by selecting the lane in which the vehicle speed fluctuation of the own vehicle can be reduced, it is possible to realize the fuel-efficient traveling of the own vehicle.

In the present embodiment, a vehicle using an engine as a main power source has been described, but the present invention is not limited thereto, and a vehicle using an electric motor as a power source may be used. In the case of the electric vehicle in which the vehicle is driven and travels by a motor by electric power, the reduction of electric power consumption can be expected. Further, the vehicle equipped with the automatic driving system 1 of the present embodiment may be a vehicle in which the driver does not need to perform any operation related to driving, or a vehicle in which the driver is in charge of some operations.

In addition to the above-described contents, the determination of the limiting factor on the adjacent lane and the limiting factor on the own lane in the present embodiment is different depending on various traveling scenes of the own vehicle. This will be described below with reference to FIGS. 7 to 10.

<Determination of Limiting Factor on Adjacent Lane>

For example, the limiting factor determination unit 101 calculates a traffic density or an average speed of vehicles traveling in an adjacent lane, and determines that there are limiting factor on the adjacent lane when the calculated traffic density is equal to or larger than the set traffic density or the calculated average speed is less than a predetermined value.

Figure 7:
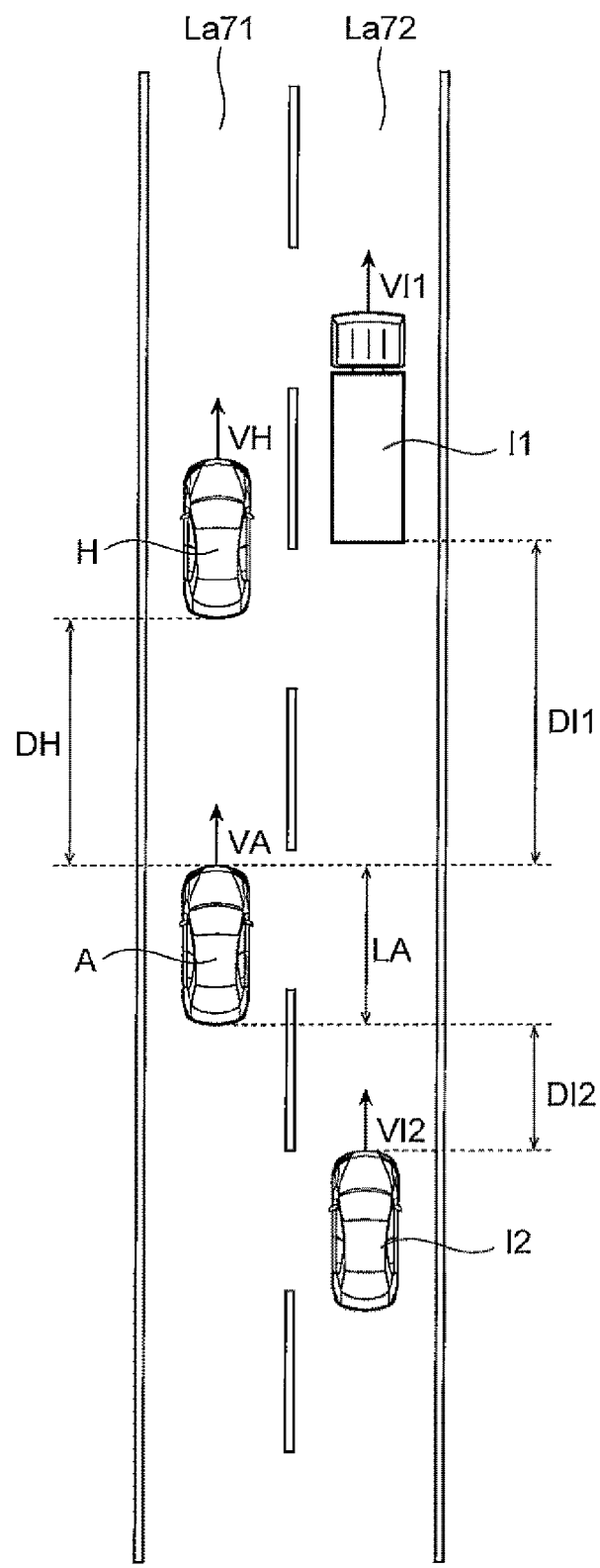
FIG. 7 is a schematic diagram for describing a determination of a limiting factor on an adjacent lane based on an own vehicle, a preceding vehicle, and a following vehicle on the adjacent lane.

Specifically, as illustrated in FIG. 7, the preceding vehicle H exists in an own lane (that is, the left lane) La71, and there are a preceding vehicle I1 and a following vehicle I2 traveling behind the own vehicle A in an adjacent lane (that is, right lane) La72. In this case, as the average speed of the vehicles traveling in the adjacent lane La72, an average value VIa of a speed VI1 of the preceding vehicle I1 and a speed VI2 of the following vehicle I2 can be used. Further, the collision margin can be calculated by substituting the average value VIa into the speed VG of the above Equation (2). Then, when the calculated collision margin falls below 1, the limiting factor determination unit 101 may determine that there is the limiting factor on the adjacent lane.

In addition, when the calculated average value VIa is less than a predetermined value, the limiting factor determination unit 101 may determine that there is the limiting factor on the adjacent lane. For example, the difference between the average value VIa and the speed VA of the own vehicle A is obtained, and when the obtained difference is larger than the relative speed between the own vehicle A and the preceding vehicle H and VIa<VA, the limiting factor determination unit 101 may be determined that there is the limiting factor on the adjacent lane.

On the other hand, a traffic density K of the vehicle traveling in the adjacent lane La72 can be calculated by Equation (3) based on an inter-vehicle distance DI1 between the own vehicle A and the preceding vehicle I1, an inter-vehicle distance DI2 between the own vehicle A and the following vehicle I2, and a vehicle length LA of the own vehicle A.

$$K = \frac{1000}{S} = \frac{1000}{DI1 + DI2 + LA} \quad (3)$$

In Equation (3), S is the sum of the inter-vehicle distance DI1, the inter-vehicle distance DI2, and the vehicle length LA, and the units of the inter-vehicle distance DI1, the inter-vehicle distance DI2, and the vehicle length LA each are a meter (m). Then, when the traffic density K calculated by Equation (3) is equal to or larger than the set traffic density (for example, 25 vehicles/km), the limiting factor determination unit 101 determines that there is the limiting factor on the adjacent lane. The set traffic density may be, for example, a critical traffic density of a road, measured for each road, and stored in association with the map information acquisition unit 126, or may be a method based on the own vehicle position information acquisition unit 125 or may be set to 25 vehicles/km or 20 vehicles/km as a representative value.

Note that the traffic density K is calculated each time a vehicle group including the preceding vehicle I1 and a following vehicle I2 is detected. For example, when the own vehicle A overtakes the preceding vehicle I1 and the preceding vehicle in the new adjacent lane La72 is detected ahead, or when the own vehicle A is overtaken by the following vehicle I2 and the following vehicle is detected, respectively, the traffic density K is calculated. In addition, the average value of the calculation results plural times may be taken by recalculation at a predetermined time, and the taken average value may be used as the traffic density K, or the weight of the latest detected value may be increased to delete the past detected value, and the latest detected value may be set to the traffic density K.

In this way, as in the first embodiment, it is possible to select a lane in which the vehicle speed fluctuation of the own vehicle can be small, so it is possible to realize fuel-efficient traveling of the own vehicle.

In addition, when the adjacent lane is an oncoming lane, the limiting factor determination unit 101 calculates the collision margin time based on the distance from the oncoming vehicle traveling in the oncoming lane to the own vehicle and the relative speed between the oncoming vehicle and the own vehicle, and determines that there is the limiting factor on the adjacent lane when the calculated collision margin time is less than the predetermined value.

Figure 8:
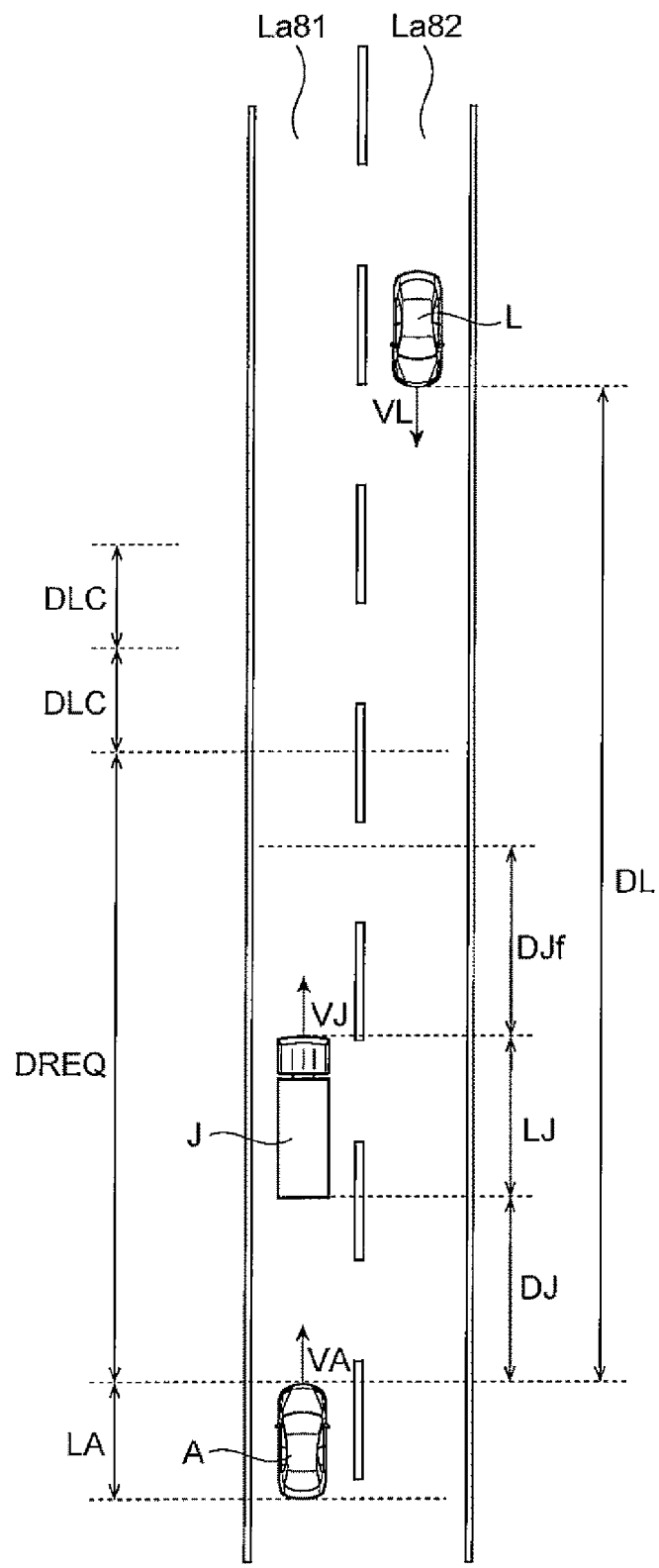
FIG. 8 is a schematic diagram for describing the determination of the limiting factor on the adjacent lane when the adjacent lane is an oncoming lane.

Specifically, for example, as illustrated in FIG. 8, a preceding vehicle J exists in an own lane La81, which is a one-lane road on each side, and an oncoming vehicle L exists in an oncoming lane La82 which is an adjacent lane. When the own vehicle A changes a lane and tries to enter in front of the preceding vehicle J without colliding with the oncoming vehicle L, the limiting factor determination unit 101 calculates a necessary overtaking distance DREQ based on an inter-vehicle distance DJ between the own vehicle A and a preceding vehicle J, a vehicle length LJ of the preceding vehicle J, an inter-vehicle distance DJf that can secure a sufficient inter-vehicle time for the preceding vehicle J in front of the preceding vehicle J, and a vehicle length LA of the own vehicle A. The inter-vehicle distance DJf is calculated by multiplying the speed VJ of the preceding vehicle J by the inter-vehicle time. For example, when the speed VJ is 10 m/s and the inter-vehicle time of 3 seconds is secured, the inter-vehicle distance DJf is 30 m.

The vehicle length LJ of the preceding vehicle J is set to values of 7 m, 15 m, and 25 m which are classified according to a vehicle type, based on a vehicle height or a vehicle width of the preceding vehicle J detected by the imaging device 120. Here, when the vehicle length LJ of the preceding vehicle J can be acquired via the communication device 122, the acquired value may be used. In addition, when the vehicle type cannot be classified, the limiting factor determination unit 101 may determine that there is the limiting factor on the oncoming lane (that is, limiting factor on the adjacent lane) at that time. Further, for the vehicle whose vehicle type cannot be classified, the value of the longest classification result may be adopted for the vehicle length.

Based on the necessary overtaking distance DREQ calculated in this way, twice the distance DLC that the own vehicle A travels while changing a lane, and the estimated average speed while the own vehicle A completes a series of overtaking, an overtaking time TOT is calculated. Further, the collision margin time is calculated by the above Equation (1) based on the speed VA of the own vehicle A, the speed VL of the oncoming vehicle L, and the inter-vehicle distance DL between the own vehicle A and the oncoming vehicle L. Then, the limiting factor determination unit 101 compares the calculated overtaking time TOT with the collision margin time, and determines that there is the limiting factor on the oncoming lane when the overtaking time TOT is smaller than the collision margin time.

In this way, when the road on which the own vehicle A travels is a one-lane road on each side and the oncoming vehicle L exists in the oncoming lane La82, the limiting factor determination unit 101 determines whether the own vehicle A can overtake the preceding vehicle J, and the lane selection unit 102 selects a lane with little vehicle speed fluctuation as a traveling route.

As a result, by selecting the lane in which the vehicle speed fluctuation of the own vehicle can be reduced, it is possible to realize the fuel-efficient traveling of the own vehicle.

<Determination of Limiting Factor on Own Lane>

For example, the limiting factor determination unit 101 calculates the collision margin with respect to the preceding vehicle when the preceding vehicle is detected from the state in which the preceding vehicle is not detected in the own lane, and determines that there is a limiting factor on the own lane when the calculated collision margin is smaller than a predetermined value.

Figure 9:
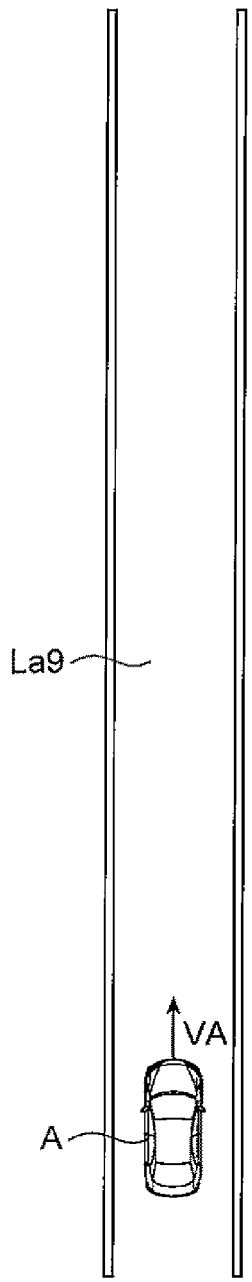
FIG. 9 is a schematic diagram for describing the determination of the limiting factor on an own lane when the own vehicle catches up with a preceding vehicle.
Figure 9:
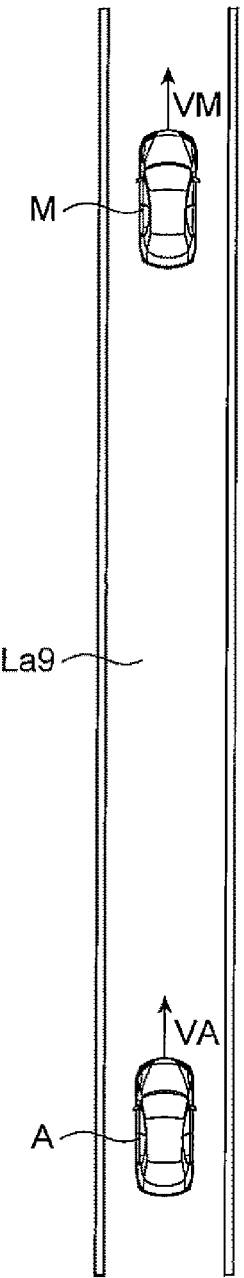

Specifically, as illustrated in FIG. 9, the own vehicle A is traveling on a one-lane road (that is, own lane) La9, and is in a state (see FIG. 9(*b*) of catching up with a preceding vehicle M (in other words, the preceding vehicle M is detected) from the state (see FIG. 9(*a*)) in which there is no preceding vehicle M in the own lane La9 (in other words, the preceding vehicle M is not detected). A one-lane road is illustrated in FIG. 9, but a road with a plurality of lanes may be applied.

Figure 10:
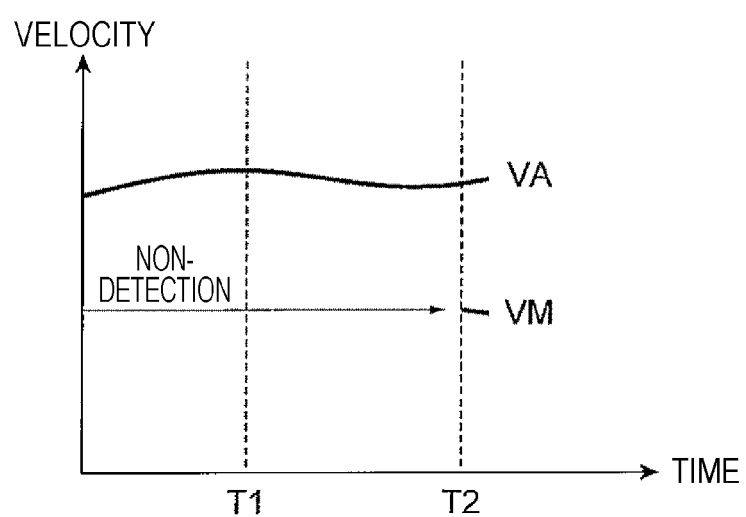
FIG. 10 is a graph illustrating a change in speed of an own vehicle and a preceding vehicle in FIG. 9.

FIG. 10 is a graph illustrating the change between the speed VA of the own vehicle A and the speed VM of the preceding vehicle M in FIG. 9. Time T1 corresponds to the state illustrated in FIG. 9(*a*), and time T2 corresponds to the state illustrated in FIG. 9(*b*). The preceding vehicle M is not detected at time T1, but the preceding vehicle M is detected at time T2. Then, when the detected preceding vehicle M is low speed (that is, VA>VM), the limiting factor determination unit 101 calculates the collision margin by the above Equation (2), and when the calculated collision margin falls below 1, the limiting factor determination unit 101 determines that the own vehicle A should start deceleration in order to avoid a collision, that is, determines that there is the limiting factor on the own lane.

In this way, as in the first embodiment, it is possible to select a lane in which the vehicle speed fluctuation of the own vehicle can be small, so it is possible to realize fuel-efficient traveling of the own vehicle.

In addition, the limiting factor determination unit 101 determines that there is the limiting factor on the own lane when the state in which the inter-vehicle distance between the preceding vehicle traveling in the own lane and the own vehicle is less than a predetermined value continues for a predetermined time or when the state in which the speed of the own vehicle is less than the predetermined value with respect to the preset speed or the speed limit of the own lane similarly continues for the predetermined time.

Here, the predetermined value is the inter-vehicle distance corresponding to the vehicle density which is the critical traffic density. For example, when the critical traffic density is 25 vehicles/km, if the vehicle length is zero, the predetermined value is 40 m. Further, the vehicle length may be assumed to be 5 m or 10 m, and the predetermined value in that case can be a value such as 35 m or 30 m. On the other hand, when the critical traffic density is 20 vehicles/km, the above predetermined values can take values such as 50 m, 45 m, and 40 m. That is, the above-described predetermined value may be set to an arbitrary inter-vehicle distance distributed in the range of 30 m to 50 m.

The critical traffic density is the vehicle density at which the average speed is lowered and the traffic volume cannot be obtained when the traffic density becomes larger than that, in other words, the traffic density at which the maximum traffic volume can be obtained in the traveling route.

Here, the predetermined time may be any value in the range of 20 seconds to 120 seconds, and may be set to, for example, 40 seconds or 25 seconds. Then, when the own vehicle travels at a speed of 100 km/h, the viewing distance considered to be safe is set to 440 m, which is the time required when the vehicle travels at a speed of 40 km/h or 60 km/h for the above predetermined time. That is, the time may be set to be sufficient for the driver to recognize an obstacle in the course of the own vehicle and grasp the situation. On the other hand, as the time is set for a longer period of time, the opportunity for the own vehicle to change a lane decreases, so there is a possibility that the effect of suppressing the vehicle speed fluctuation of the own vehicle and suppressing the deterioration of fuel efficiency decreases.

In addition, the state in which the speed of the own vehicle is less than the predetermined value with respect to the preset speed or the speed limit of the own lane is, for example, a state in which the speed is less than 0.61 or less than 0.37 times the speed set by the driver or the speed limit of the route. Here, 0.61 times is the relationship between the traffic density of the traveling route and the space average speed, corresponds to the speed at which the critical traffic density is obtained by substituting $k/k_c=1$ into the following Equations (4) (Drake's Equation) and (5) (Underwood's Equation), and becomes a coefficient of arbitrary speed $v_f$.

$$v = v_f e^{-\frac{1}{2}(k/k_c)^2} \qquad (4)$$

$$v = v_f e^{-k/k_c} \qquad (5)$$

In Equation (4), v is a speed for determining that it is less than a predetermined value, and $v_f$ is a free speed, that is, the speed set by the driver or the speed limit of the route. Substituting $k/k_c=1$ into $\exp(-1/2(k/k_c)^2)$ in Equation (4), the result is $\exp(-1/2)$ and is approximately 0.61. Similarly, substituting $k/k_c=1$ into Equation (5), the result is approximately 0.37.

In Equations (4) and (5), k is the traffic density and $k_c$ is the critical traffic density. That is, when the traffic density exceeds the critical traffic density, congestion occurs, so that the average traveling speed of the traveling route decreases, and the limiting factor determination unit 101 determines that there is the limiting factor on the own lane. Then, when the state in which the speed is less than 0.61 times or 0.37 times the speed set by the driver or the speed limit of the route similarly continues for a predetermined time, the predetermined time is set to a value such as 25 seconds or 40 seconds, similarly to the inter-vehicle distance.

In this way, as in the first embodiment, it is possible to select a lane in which the vehicle speed fluctuation of the own vehicle can be small, so it is possible to realize fuel-efficient traveling of the own vehicle.

Second Embodiment

Figure 11:
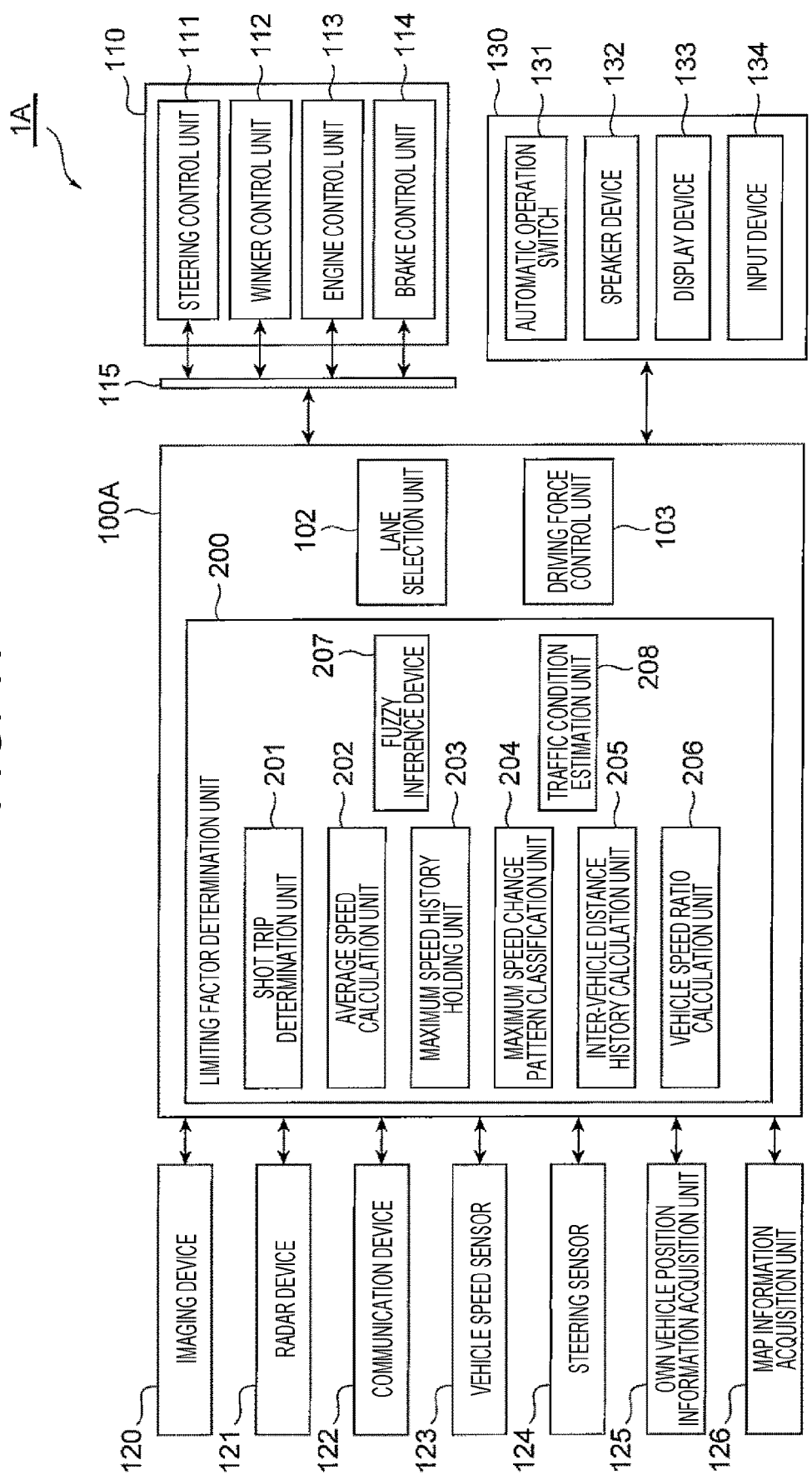
FIG. 11 is a schematic configuration diagram illustrating an automatic driving system to which a vehicle control device according to a second embodiment is applied.

FIG. 11 is a schematic configuration diagram illustrating an automatic driving system to which a vehicle control device according to a second embodiment is applied. An automatic driving system 1A according to the present embodiment is different from the above-described first embodiment in a configuration of a vehicle control device 100A, and more specifically, in the configuration of the limiting factor determination unit 200. Other configurations are the same as those in the first embodiment, and duplicate description thereof will be omitted.

As illustrated in FIG. 11, a limiting factor determination unit 200 of the vehicle control device 100A according to the present embodiment includes a short trip determination unit 201, an average speed calculation unit 202, a maximum speed history holding unit 203, and a maximum speed change pattern classification unit 204, an inter-vehicle distance history calculation unit 205, a vehicle speed ratio calculation unit 206, a fuzzy inference device 207 executing inference based on calculation results of each calculation unit, and a traffic condition estimation unit 208 estimating a traffic condition based on an inference result of the fuzzy inference device 207.

The limiting factor determination unit 200 having such a structure performs the inference based on at least one of a speed history of the own vehicle, a maximum speed reached when a short trip is taken from start to stop, a traveling time of a short trip, a ratio of a time taken to detect a preceding vehicle to a traveling time of the short trip, a ratio of a time when the distance between the vehicle and the preceding vehicle detected during the short trip is less than a predetermined value to the traveling time of the short trip, a ratio of a current traveling speed to an average value of the maximum speed in multiple short trips, and an elapsed time from updating the maximum speed in the state (that is, during the current trip where the short trip is not completed) in which the vehicle has not experienced a stop after reaching the maximum speed after starting, and determines the limiting factor on the own lane based on the obtained inference result.

Specifically, the limiting factor determination unit 200 estimates the traffic condition of the route (in other words, the own lane) on which the own vehicle travels as the limiting factor, and assumes that this state will continue at a temporary point, which is used as the limiting factor existing in the course of the own vehicle.

A temporary point is, for example, intersections, confluences, points where the number of lanes decreases or increases, tunnels, sags, toll gates, bus stops, tram stops, construction sites, and points that can become traffic bottlenecks, and means that the section extends to that point when there is an intersection where traffic control is carried out by a signal 300 m ahead, for example.

Figure 12:
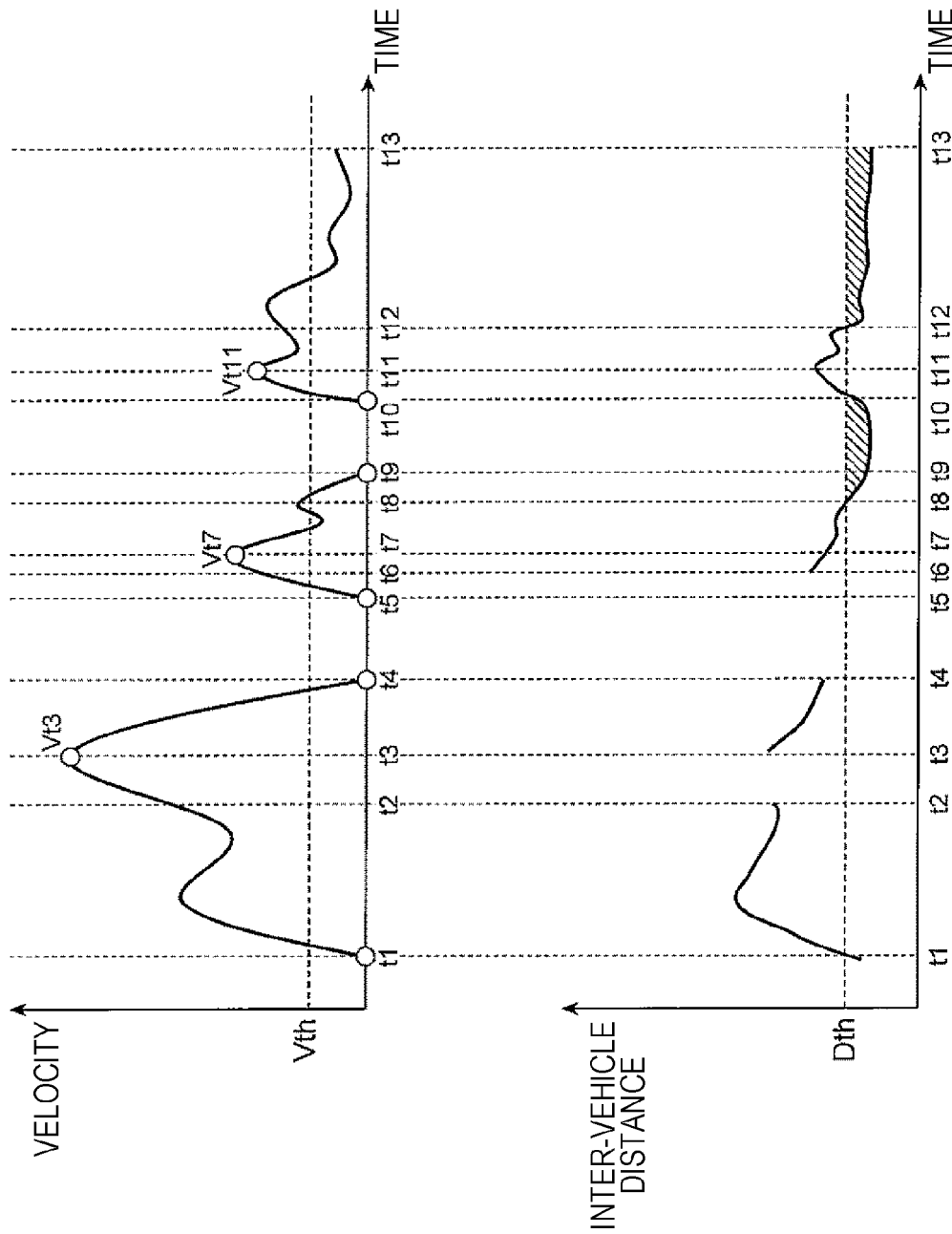
FIG. 12 is a graph illustrating a speed and an inter-vehicle distance of an own vehicle regarding an estimation of a traffic condition of a traveling route.

FIG. 12 is a graph illustrating a speed and an inter-vehicle distance of an own vehicle regarding an estimation of a traffic condition of a traveling route. In the graph illustrating the inter-vehicle distance in the lower part of FIG. 12, there are blank periods in some places. This is because the inter-vehicle distance is not measured because there is no preceding vehicle in front of the own vehicle.

The short trip determination unit 201 extracts the section from the start to the stop as a short trip based on the speed of the own vehicle. The section from time t1 to time t4 and the section from time t5 to time t9 illustrated in FIG. 12 are extracted as short trip sections, respectively. On the other hand, in the section from time t10 to t13, although the own vehicle started at time t10 and the speed increased, the own vehicle does not stop at time t13, and is in the state of the current trip which is not completed as a short trip. Since the traveling time of the short trip is the difference between the start and end times of each short trip section, the traveling time can be calculated as, for example, t4−t1.

The short trip determination unit 201 performs a short trip determination based on whether the own vehicle is traveling or stopping. That is, when the speed of the own vehicle is zero, the vehicle is stopped, while when the speed of the own vehicle is larger than zero and the state continues, the short trip time will increase.

The average speed calculation unit 202 calculates the average value of the own vehicle speed during the short trip described above. For example, one obtained by dividing the area surrounded by the figure shown by the speed detection result from time t1 to time t4 by the short trip time obtained by t4 to t1 is the average speed in the short trip section from time t1 to time t4.

The maximum speed history holding unit 203 records the maximum speed in each short trip and holds the maximum speed to retroactively refer to a plurality of previous short trips from the latest short trip. For example, the maximum speed history holding unit 203 holds the maximum speed of 3 or 5 short trips in the past from the latest short trip. Further, the maximum speed history holding unit 203 holds the maximum speed in the trip detected at any time during the short trip such as Vt3, Vt7, and Vt11.

The maximum speed change pattern classification unit 204 retroactively refers to a plurality of maximum speed histories held by the maximum speed history holding unit 203, and classifies a change pattern of a magnitude relationship, such as monotonic increase in the maximum speed, monotonic decrease in the maximum speed, no change in the maximum speed, increase in only the previous maximum speed, and no change in the recent maximum speed, based on the change in the magnitude relationship. Since it is rare that the maximum speeds have exactly the same value, it is preferable to give a range in the speed in order to determine that the maximum speed does not change. For example, there is a method such as interpreting that there is no change when the difference between the two speeds is less than 5 km/h. The maximum speed change pattern classification unit 204 classifies and outputs the pattern for short trips such as at least the past 3 times, the past 5 times, or the past 10 times.

The inter-vehicle distance history calculation unit 205 refers to the measurement result of the inter-vehicle distance illustrated in the graph at the bottom of FIG. 12. For example, focusing on the short trip section from time t1 to time t4, since the inter-vehicle distance is not always measured over the entire short trip section, such as from time t1 to time t2 and from time t3 to time t4, in addition to the short trip time, the time from the detection of the preceding vehicle to the loss of sight is measured as the time when the preceding vehicle was detected. In addition, the preceding vehicle may be lost momentarily due to a curve or a slope. Since such a situation is also assumed, for the calculation of the time when the preceding vehicle is detected, a method of resetting measurement after a lapse of a predetermined time rather than immediately resetting measurement when the preceding vehicle is lost is considered. A time such as 30 seconds or 60 seconds is appropriate as such a predetermined time, and may be made variable according to the speed of the own vehicle. In addition, when the own vehicle is stopped, the reset may be performed for a longer time, the stop time is not measured as the time when the preceding vehicle is detected, and the detection time may be measured when the speed of the own vehicle is larger than zero.

The inter-vehicle distance history calculation unit 205 calculates the time when the preceding vehicle is detected in this way, and furthermore, calculates the ratio of the time when the inter-vehicle distance is less than the predetermined value Dth to the time when the preceding vehicle is detected. The predetermined value Dth may be set to a value such as 40 m or 50 m as described above.

The vehicle speed ratio calculation unit 206 calculates the ratio of the time when the vehicle travels at a predetermined speed less than Vth to the time when the speed is at least larger than zero, similar to the above-mentioned inter-vehicle distance. The predetermined value Vth may be set to a value such as 0.61 times or 0.37 times the speed or speed limit set by the driver as described above.

Figure 13:
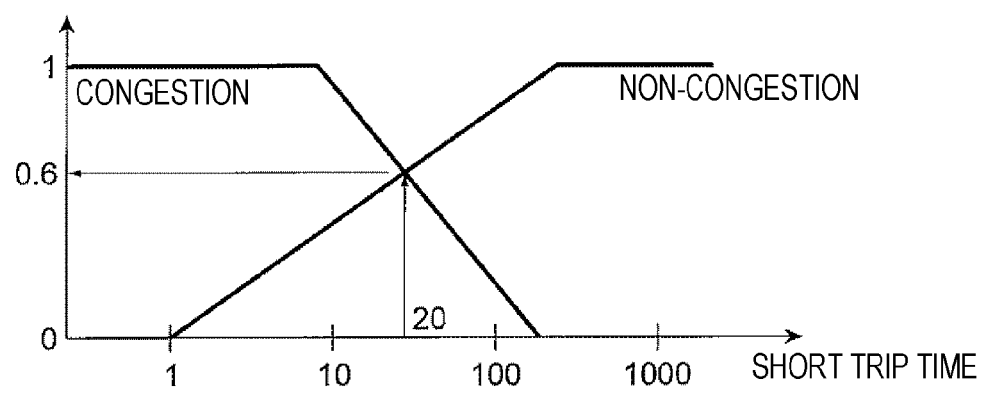
FIG. 13 is a diagram for describing a membership function in fuzzy inference.
Figure 13:
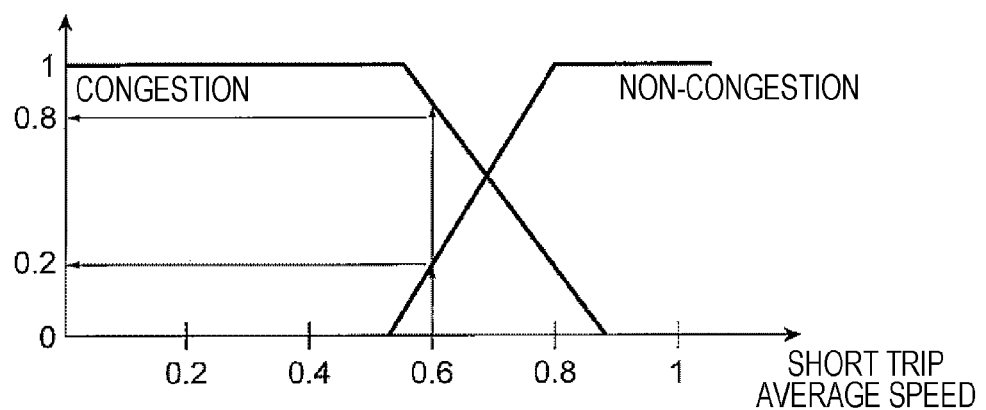

The fuzzy inference device 207 infers the traffic condition based on the results calculated by the short trip determination unit 201 and each calculation unit described above. Specifically, the fuzzy inference device 207 infers that the slower the average speed with respect to the short trip time, the more congested the traveling route of the own vehicle is, or infers that the longer the time for detecting the preceding vehicle and the larger the ratio at which the inter-vehicle distance is less than the predetermined value, the more congested the route is. The fuzzy inference device 207 sets some inferences as fuzzy inference rules, evaluates the matching degree by the corresponding membership function as illustrated in FIG. 13, and calculates the estimation result of the traffic condition by the center of gravity method or the like. The membership function can simplify the arithmetic process by using the trapezoidal or triangular function as illustrated in FIG. 13, but is not limited thereto when the microcomputer used has high computing power and resources are available.

For example, the following five contents can be mentioned as the fuzzy inference rule. In this case, not all rules are required, and some combinations may be used.

First, when the time ratio at which the vehicle travels at the speed of the own vehicle less than the predetermined speed Vth is large and the average value of the speed of the own vehicle is small, the congestion is high. Second, the congestion is high when the time when the preceding vehicle is detected is long and the time ratio at which the inter-vehicle distance is less than the predetermined value Dth is high. Third, when the time when the preceding vehicle is detected is long and the elapsed time from the time when the maximum speed is detected is long, the congestion is high. Fourth, the higher the maximum speed, the higher the congestion. Fifth, the slower the current traveling speed compared to the latest short trip maximum speed, the higher the congestion.

These rules describe the case where the congestion is high, but the opposite situation can be said that the non-congestion is high.

The congestion and the non-congestion are obtained as numerical values normalized from zero to 1, which indicates a higher value as the matching degree of the above-described rules is higher. For example, in FIG. 13, assuming that the short trip time is 20 seconds and the average speed of short trips is 0.6 times the speed limit of the route, both the congestion and the non-congestion are calculated as 0.6 based on the short trip time, respectively, and the congestion is calculated as 0.8 and the non-congestion is calculated as 0.2 based on the average speed of short trips, respectively.

Taking these minimum values, the congestion of 0.6 and the non-congestion of 0.2 are the inference results in these rules. Then, as illustrated in FIG. 14, the position of the center of gravity is calculated, and the position of the center of gravity is converted to obtain the estimation result of the traffic condition.

Figure 14:
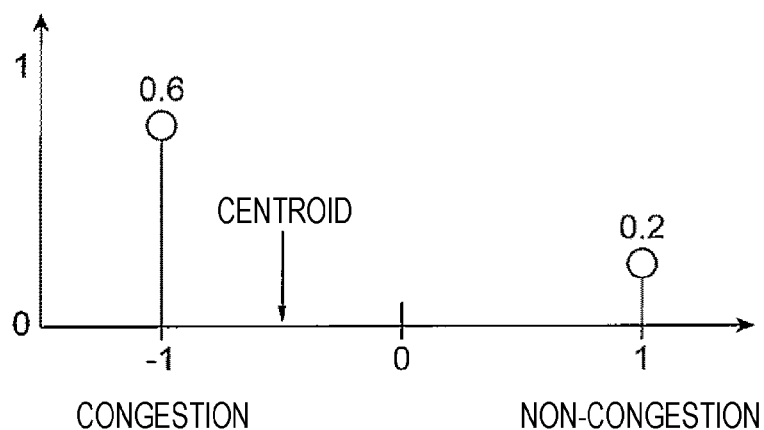
FIG. 14 is a diagram for describing a traffic condition estimation result and a traffic flow speed regarding the estimation of the traffic condition of the traveling route.
Figure 14:
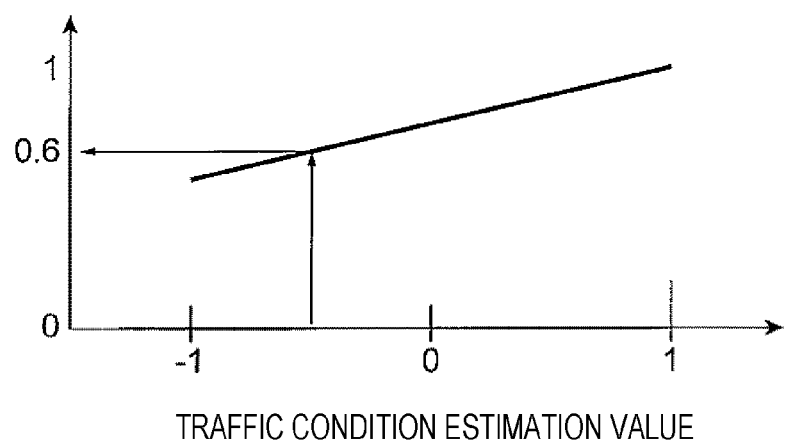

Based on the congestion and the non-congestion inferred as described above, the traffic condition estimation unit 208 sets the center of gravity as the traffic condition estimated value as illustrated in FIG. 14, and estimates the traffic flow speed from a function that inputs the estimated value. The traffic flow speed may be set to a speed set by the driver or a multiple of the speed limit of the route, or may be set to a speed of 40 km/h. Such functions can use linear functions, table functions, polynomials, and the like for the estimated values of traffic conditions.

Based on the above results, the limiting factor determination unit 200 determines that there is a limiting factor on the own lane when the traffic flow speed of the route on which the own vehicle travels is low. As described above, the low speed means a case where the speed falls below 0.61 times or 0.37 times the speed set by the driver or the speed limit.

According to the vehicle control device 100A of the present embodiment, as in the first embodiment, it is possible to select a lane in which the vehicle speed fluctuation of the own vehicle can be small, so that it is possible to realize fuel-efficient traveling of the own vehicle.

In addition to the above-described contents, various modifications can be considered for the determination of the limiting factor determination unit.

(First Modification)

In first modification, the limiting factor determination unit performs inference based on at least one of the average speed of the vehicles traveling in the adjacent lane, the number of times the vehicle overtakes the vehicle traveling in the adjacent lane or the number of times the vehicle traveling in the adjacent lane is overtaken, and the arrival frequency or the arrival interval of the vehicle traveling in the adjacent lane, and determines whether or not there is the limiting factor on the adjacent lane based on the obtained inference result.

For example, the following four rules can be mentioned to determine the limiting factor on the adjacent lane. In this case, not all rules are required, and some combinations may be used.

In addition, new rules different from these may be added.

First, the lower the average speed of the vehicles traveling in the adjacent lane, the higher the congestion in the adjacent lane. Second, the lower the average speed of the vehicles traveling in the adjacent lane and the more often the number of times the own vehicle overtakes the vehicle in the adjacent lane, the higher the congestion in the adjacent lane. Third, the more the vehicles that are traveling at least and the more the number of vehicles arriving next to the own vehicle in the adjacent lane, the higher the congestion in the adjacent lane. Fourth, the smaller the average value of the arrival intervals of the vehicles traveling in the adjacent lane, the higher the congestion in the adjacent lane.

The limiting factor determination unit evaluates the congestion and non-congestion of the adjacent lane by combining the plurality of rules, and determines that there is the limiting factor on the adjacent lane when the traffic flow speed of the adjacent lane is low. Note that as described above, the low speed means a case where the speed falls below 0.61 times or 0.37 times the speed set by the driver or the speed limit.

According to the modification, it is possible to select a lane in which the vehicle speed fluctuation of the own vehicle can be small, so that it is possible to realize fuel-efficient traveling of the own vehicle.

(Second Modification)

In the second modification, when the limiting factor determination unit calculates the distance from the own vehicle to the public transportation base and determines that there is the limiting factor on the own lane when the calculated distance to the public transportation base is less than a predetermined value, and the speed of the preceding vehicle traveling in the own lane continues to decrease toward the public transportation base.

Figure 15:
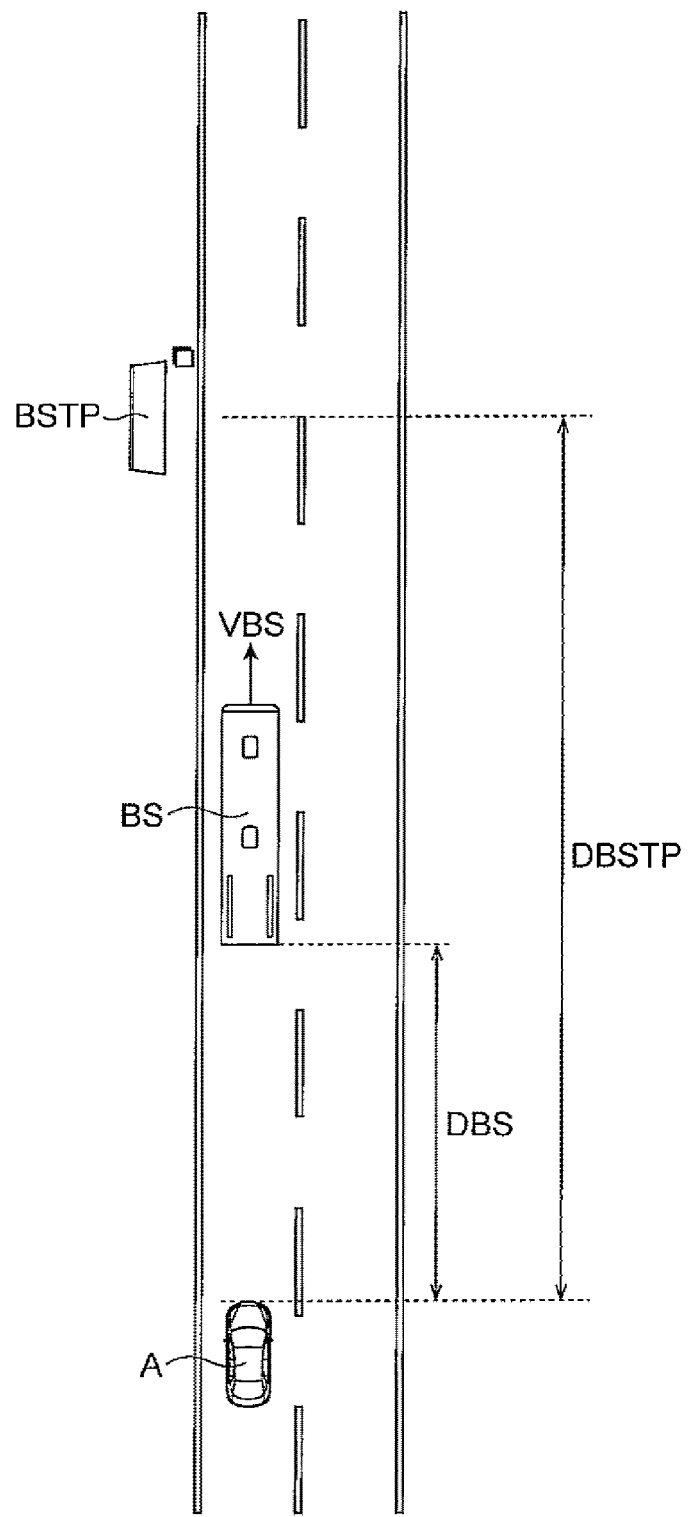
FIG. 15 is a schematic diagram illustrating a traveling state of a preceding vehicle approaching a public transportation base and an own vehicle.

Specifically, as illustrated in FIG. 15, a preceding vehicle (here, the preceding vehicle is a bus) BS is decelerating toward a bus stop BSTP, and the own vehicle A is following-up the preceding vehicle BS. At this time, the limiting factor determination unit acquires the position of the own vehicle A and the map information around the own vehicle A via the own vehicle position information acquisition unit 125 and the map information acquisition unit 126, and calculates a road distance DBSTP up to the bus stop BSTP based on the acquired information. When the road distance DBSTP is less than the predetermined value and an inter-vehicle distance DBS between the preceding vehicle BS and the own vehicle A is less than or equal to the road distance DBSTP, the limiting factor determination unit calculates the acceleration of the preceding vehicle BS based on the acquired speed VBS of the preceding vehicle BS. When the calculated acceleration is negative and the predicted stop position of the preceding vehicle BS is within a predetermined value from the bus stop BSTP, the limiting factor determination unit estimates that the preceding vehicle BS is likely to stop toward the bus stop BSTP, and determines that there is the limiting factor on the own lane.

A predetermined value within the predetermined value from the bus stop BSTP which is the stop position is the distance determined based on the length of the preceding vehicle BS, and a value such as 20 m or 50 m is appropriate. 20 m is a vehicle length which is generally considered to be a passenger vehicle, and 50 m is the position of the rearmost vehicle when a plurality of passenger vehicles are considered to be stopped. In addition to the bus stop BSTP as the public transportation base, a taxi stand and a tram stop at the destination of the route on which the own vehicle A travels are mentioned. Even in these cases, the determination of the limiting factor determination unit described above is applied.

Further, the determination of the limiting factor determination unit described above is also applied to the case of the traffic light and the stop line instead of the public transportation base. For example, when the traffic light in front of the own vehicle A is displayed in red or yellow, the limiting factor determination unit calculates the acceleration and speed of the preceding vehicle based on the distance to the stop line, estimates that the preceding vehicle is stopped within a predetermined range, and determines that there is the limiting factor on the own lane. Further, the limiting factor determination unit may acquire the display of the signal, the remaining time until the next display, and the schedule of the display via the communication device 122. The limiting factor determination unit may calculate the display cycle of the signal based on the acquired information and predict the display at the time when the own vehicle A arrives at the stop line.

According to the modification, it is possible to select a lane in which the vehicle speed fluctuation of the own vehicle can be small, so that it is possible to realize fuel-efficient traveling of the own vehicle.

Third Modification

In the third modification, the limiting factor determination unit acquires the limiting factor information transmitted from the preceding vehicle traveling in the own lane and the adjacent lane via the communication device 122, and determines whether there are the limiting factor on the own lane and the limiting factor on the adjacent lane based on the acquired limiting factor information. In this way, it is possible to improve the accuracy of the determination by making a determination based on the limiting factor information acquired from another vehicle in addition to the information acquired via the imaging device 120 or the radar device 121 of the own vehicle. As a result, by selecting the lane in which the vehicle speed fluctuation of the own vehicle can be reduced, it is possible to realize the fuel-efficient traveling of the own vehicle.

Third Embodiment

The automatic driving system of the third embodiment has the same structure as the automatic driving system 1 of the first embodiment, but is different from the first embodiment in that the driving force control unit 103 corrects the driving force. Specifically, when the limiting factor determination unit 101 determines that there are the limiting factor on the own lane and the limiting factor on the adjacent lane, and the preceding vehicle in the own lane changes a lane, the driving force control unit 103 corrects the driving force so as to maintain the speed of the own vehicle in the immediately preceding state. Hereinafter, a detailed description will be given with reference to FIGS. 16 and 5.

In the state illustrated in FIG. 5(a), the target speed at which the own vehicle A does not collide with the preceding vehicle E is set based on the inter-vehicle distance DE between the own vehicle A and the preceding vehicle E. In the state illustrated in FIG. 5(b), the target speed based on the preceding vehicle E is set from the start to the end of the lane change of the preceding vehicle E.

Figure 16:
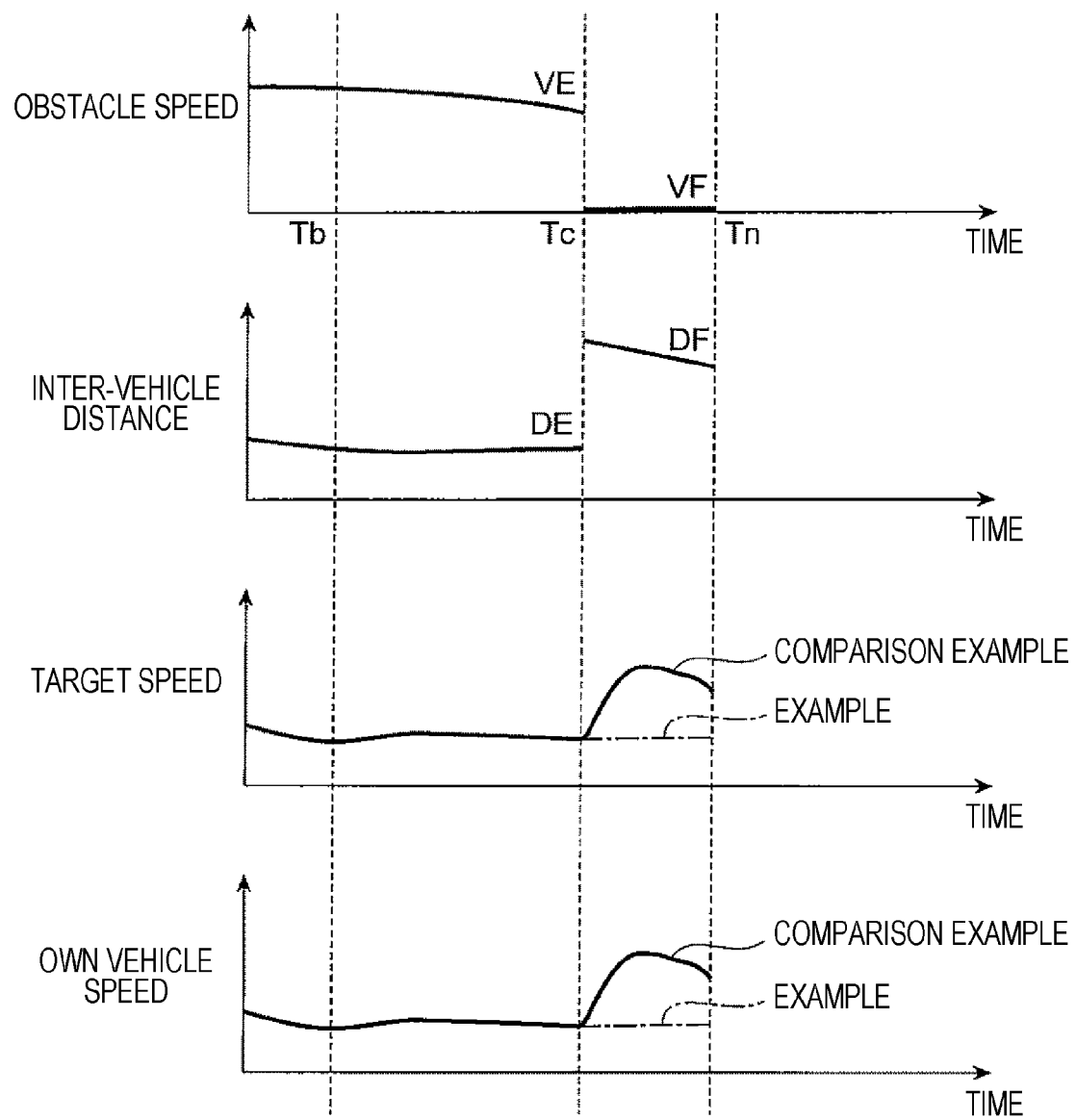
FIG. 16 is a diagram for describing a difference between an example and a comparative example regarding setting of a target speed performed by a driving force control unit of a third embodiment.

For example, in the process from time Tb to time Tc illustrated in FIG. 16, the target speed is set based on the preceding vehicle E.

In the state illustrated in FIG. 5(c), when the lane change of the preceding vehicle E ends, the own vehicle A continues to select the own lane La51 and travels, so the obstacle in the following traveling changes to the rearmost vehicle F. At this time, the inter-vehicle distance DF between the rearmost vehicle F and the own vehicle A is larger than the inter-vehicle distance DE from the preceding vehicle E which has been an obstacle so far. Therefore, from the time Tc illustrated in FIG. 16, the target speed for shortening the inter-vehicle distance DF is newly set, that is, the speed as shown by the solid line (comparative example) in FIG. 16 is set.

When the rearmost vehicle F is stopped, the own vehicle A decelerates to avoid a collision with the rearmost vehicle F. As a result, the speed changes as illustrated in the comparative example. Here, as illustrated by the alternate long and short dash line (Example) in FIG. 16, the target speed is set so that the change in speed becomes small regardless of the inter-vehicle distance DF, and the speed of the own vehicle becomes the same as the speed immediately before, so it is possible to suppress the vehicle speed fluctuation of the own vehicle A and realize the traveling that can suppress the deterioration in the fuel efficiency.

In this way, the target speed is generated without immediately filling the space created in front of the own vehicle, and the driving force control unit 103 corrects the driving force to maintain the speed of the own vehicle A in the immediately preceding state according to the target speed, so it is possible to suppress the vehicle speed fluctuation of the own vehicle and realize the traveling that can suppress the deterioration in the fuel efficiency.

The preferred embodiments of the present invention have been described in detail with reference to the drawings. The drawings do not show the details of the functions, configurations, and dimensions, and the drawings are omitted or simplified for elements that are not directly related or that are considered to be duplicates of functions. Controls and functions that is not described in certain embodiments of the present invention will be achievable by those skilled in the art by conventionally known means. The present invention is not necessarily characterized by including all the configurations described, and is not limited to the configurations of the embodiments described. It is possible to replace a part of one embodiment with another embodiment, and it is possible to add, delete, or replace other configurations for some of the configurations of each embodiment unless its characteristics are significantly changed.

REFERENCE SIGNS LIST 1,1A automatic driving system
100,100A vehicle control device
101,200 limiting factor determination unit
102 lane selection unit
103 driving force control unit
110 traveling execution unit
111 steering control unit
112 winker control unit
113 engine control unit
114 brake control unit
115 in-vehicle network
120 imaging device
121 radar device
122 communication device
123 vehicle speed sensor
124 steering sensor
125 own vehicle position information acquisition unit
126 map information acquisition unit
130 human machine interface
131 automatic operation switch
132 speaker device
133 display device
134 input device
201 short trip determination unit
202 average speed calculation unit
203 maximum speed history holding unit
204 maximum speed change pattern classification unit
205 inter-vehicle distance history calculation unit
206 vehicle speed ratio calculation unit
207 fuzzy inference device
208 traffic condition estimation unit

The invention claimed is:

1. A vehicle control device, comprising:
a limiting factor processor that determines whether there are an own limiting factor on an own lane that limits traveling of an own vehicle in the own lane and an adjacent limiting factor on an adjacent lane that limits the traveling of the own vehicle in a lane adjacent to the own lane;
a lane selection processor that selects a lane in which the own vehicle travels based on a determination result of the limiting factor processor;
a steering controller that controls steering angle operation of the own vehicle based on the lane selected by the lane selection processor; and
a driving force controller that controls a driving force of the own vehicle based on the lane selected by the lane selection processor, the driving force controller configured to, when the own vehicle and a first preceding vehicle are traveling on the own lane, control the driving force of the own vehicle to maintain a first distance between the own vehicle and the first preceding vehicle,
wherein when the limiting factor processor determines (i) the own limiting factor is on the own lane and the adjacent limiting factor is on the adjacent lane, (ii) the first preceding vehicle in the own lane is moved to the adjacent lane, and (iii) a second preceding vehicle is detected as traveling on the own lane at a second distance from the own vehicle longer than the first distance, the driving force controller corrects the driving force so as to maintain a speed of the own vehicle determined based on the first preceding vehicle when the first preceding vehicle is moved from the own lane to the adjacent lane.

2. The vehicle control device according to claim 1, wherein when the limiting factor processor determines that there is no own limiting factor on the own lane, the lane selection processor continues to select the own lane in which the own vehicle travels.

3. The vehicle control device according to claim 1, wherein when the limiting factor processor determines that there is the own limiting factor on the own lane and there is no adjacent limiting factor on the adjacent lane, the lane selection processor selects the adjacent lane.

4. The vehicle control device according to claim 1, wherein the limiting factor processor calculates a first predicted value of a vehicle speed fluctuation of the own vehicle based on the own limiting factor on the own lane and a second predicted value of the vehicle speed fluctuation based on the adjacent limiting factor on the adjacent lane, the first predicted value different from the second predicted value, and
the lane selection processor selects one of the own lane or the adjacent lane that corresponds to a lesser value of the first predicted value and the second predicted value.

5. The vehicle control device according to claim 1, wherein the limiting factor processor calculates a traffic density or an average speed of vehicles traveling in the adjacent lane, and determines that there is the adjacent limiting factor on the adjacent lane when the calculated traffic density is equal to or larger than a set traffic density or the calculated average speed is less than a predetermined value.

6. The vehicle control device according to claim 1, wherein the adjacent lane is an oncoming lane, and
the limiting factor processor calculates a collision margin time for an oncoming vehicle traveling in the adjacent lane, and determines that there is the adjacent limiting factor on the adjacent lane when the calculated collision margin time is less than a predetermined value.

7. The vehicle control device according to claim 1, wherein the limiting factor processor calculates a collision margin for a third preceding vehicle when a state in which the third preceding vehicle is not detected in the own lane changes to a state in which the third preceding vehicle is detected in the own lane, and determines that there is the own limiting factor on the own lane when the calculated collision margin is smaller than a predetermined value.

8. The vehicle control device according to claim 1, wherein the limiting factor processor determines that there is the own limiting factor on the own lane when the state in which an inter-vehicle distance between the first preceding vehicle traveling in the own lane and the own vehicle is less than a predetermined distance value continues for a predetermined time or when the state in which the speed of the own vehicle is less than a predetermined speed value with respect to a preset speed or a speed limit of the own lane similarly continues for the predetermined time.

9. The vehicle control device according to claim 1, wherein the limiting factor processor determines whether there is the own limiting factor on the own lane based on fuzzy inference.

10. The vehicle control device according to claim 1, wherein the limiting factor processor performs inference based on at least one of an average speed of vehicles traveling in the adjacent lane, a number of times the own vehicle overtakes a vehicle traveling in the adjacent lane or a number of times the vehicle traveling in the adjacent lane is overtaken, and an arrival frequency or an arrival interval of the vehicle traveling in the adjacent lane, and determines whether or not there is the adjacent limiting factor on the adjacent lane based on the obtained inference result.

11. The vehicle control device according to claim 1, wherein the limiting factor processor calculates a road distance from the own vehicle to a public transportation base, and determines that there is the own limiting factor on the own lane when the calculated road distance up to the public transportation base is less than a predetermined value and a speed of a third preceding vehicle traveling in the own lane continues to decrease toward the public transportation base.

12. The vehicle control device according to claim 1, wherein the limiting factor processor acquires limiting factor information transmitted from a third preceding vehicle traveling in the own lane or the adjacent lane via a communication means, and determines whether there are the own limiting factor on the own lane and the adjacent limiting factor on the adjacent lane based on the acquired limiting factor information.

* * * * *